US009826678B2

(12) United States Patent
Balutis et al.

(10) Patent No.: US 9,826,678 B2
(45) Date of Patent: Nov. 28, 2017

(54) ROBOTIC MOWING OF SEPARATED LAWN AREAS

(71) Applicant: iRobot Corporation, Bedford, MA (US)

(72) Inventors: Paul C. Balutis, Shrewsbury, MA (US); Andrew Beaulieu, Watertown, MA (US); Brian Yamauchi, Boston, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/367,047

(22) Filed: Dec. 1, 2016

(65) Prior Publication Data

US 2017/0079202 A1  Mar. 23, 2017

Related U.S. Application Data

(63) Continuation of application No. 14/579,080, filed on Dec. 22, 2014, now Pat. No. 9,538,702.

(51) Int. Cl.
*A01D 34/00* (2006.01)
*B25J 9/00* (2006.01)
(Continued)

(52) U.S. Cl.
CPC ............ *A01D 34/008* (2013.01); *B25J 5/007* (2013.01); *B25J 9/0081* (2013.01); *B25J 9/1674* (2013.01);
(Continued)

(58) Field of Classification Search
None
See application file for complete search history.

(56) References Cited

U.S. PATENT DOCUMENTS

| 2,751,030 A | 6/1956 | Null |
| 3,128,840 A | 4/1964 | Barrett |

(Continued)

FOREIGN PATENT DOCUMENTS

| DE | 19932552 | 2/2000 |
| EP | 0774702 | 5/1997 |

(Continued)

OTHER PUBLICATIONS

'ebay.com' [online]. "Zoombot Remote Controlled Vaccuum-RV-500 NEW Roomba 2," Apr. 2005, Retrieved from the Internet at URL http://cgi.ebay.com/ws/eBayISAPI.dll?ViewItem&category=43526&item=4373497618&rd=1, accessed Apr. 2005, 7 pages.

(Continued)

*Primary Examiner* — Jonathan M Dager
(74) *Attorney, Agent, or Firm* — Fish & Richardson P.C.

(57) ABSTRACT

A method of mowing multiple areas includes training a robotic mower to mow at least two areas separated by a space, including moving the robotic mower about the areas while storing data indicative of location of boundaries of each area relative to boundary markers, training the robotic mower to move across the space separating the areas, and initiating a mowing operation. Training the robotic mower to move across the space separating the areas includes moving the robotic mower to a traversal launch point of a first of the areas and moving the robotic mower to a traversal landing point of a second of the areas. The mowing operation causes the robotic mower to move to the traversal launch point, move from the traversal launch point across the space to the traversal landing point, and then mow the second of the areas.

23 Claims, 13 Drawing Sheets

(51) Int. Cl.
  *B25J 5/00* (2006.01)
  *B25J 9/16* (2006.01)
  *G05D 1/02* (2006.01)
  *A01D 101/00* (2006.01)
(52) U.S. Cl.
  CPC ....... *G05D 1/0219* (2013.01); *A01D 2101/00* (2013.01); *G05D 1/0265* (2013.01); *G05D 2201/0208* (2013.01); *Y10S 901/01* (2013.01)

(56) References Cited

U.S. PATENT DOCUMENTS

| | | |
|---|---|---|
| 3,385,041 A | 5/1968 | Douglas |
| 3,457,575 A | 7/1969 | Bienek |
| 3,550,714 A | 12/1970 | Bellinger |
| 3,674,316 A | 7/1972 | De Brey |
| 3,924,389 A | 12/1975 | Kita |
| 3,937,174 A | 2/1976 | Haaga |
| 3,946,543 A | 3/1976 | Templeton |
| 4,119,900 A | 10/1978 | Kremnitz |
| 4,133,404 A | 1/1979 | Griffin |
| 4,163,977 A | 8/1979 | Polstorff |
| 4,306,329 A | 12/1981 | Yokoi |
| 4,369,543 A | 1/1983 | Chen et al. |
| 4,513,469 A | 4/1985 | Godfrey et al. |
| 4,545,453 A | 10/1985 | Yoshimura et al. |
| 4,556,313 A | 12/1985 | Miller et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,777,416 A | 10/1988 | George, II et al. |
| 4,782,550 A | 11/1988 | Jacobs |
| 4,811,228 A | 3/1989 | Hyyppa |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Steams et al. |
| 5,163,202 A | 11/1992 | Kawakami et al. |
| 5,163,273 A | 11/1992 | Wojtkowski et al. |
| 5,165,064 A | 11/1992 | Mattaboni |
| 5,204,814 A * | 4/1993 | Noonan ............... A01D 34/008 180/168 |
| 5,208,521 A | 5/1993 | Aoyama |
| 5,216,777 A | 6/1993 | Moro et al. |
| 5,239,720 A | 8/1993 | Wood et al. |
| 5,261,139 A | 11/1993 | Lewis |
| 5,279,672 A | 1/1994 | Belker, Jr. et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Co lens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A * | 6/1996 | Miyamoto ........... A01B 69/008 56/10.2 F |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,213 A | 10/1997 | Schmutz |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,787,545 A | 8/1998 | Co lens |
| 5,794,297 A | 8/1998 | Muta |
| 5,812,267 A | 9/1998 | Everett, Jr. et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Co lens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,041,471 A | 3/2000 | Charkey et al. |
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,166,706 A | 12/2000 | Gallagher et al. |
| 6,226,830 B1 | 5/2001 | Hendriks et al. |
| 6,240,342 B1 | 5/2001 | Fiegert et al. |
| 6,255,793 B1 * | 7/2001 | Peless ................ A01D 34/008 180/168 |
| 6,259,979 B1 | 7/2001 | Holmquist |
| 6,285,930 B1 | 9/2001 | Dickson et al. |
| 6,300,737 B1 | 10/2001 | Begvall et al. |
| D451,931 S | 12/2001 | Abramson et al. |
| 6,338,013 B1 * | 1/2002 | Ruffner ............... A01B 69/008 180/167 |

(56) References Cited

U.S. PATENT DOCUMENTS

| | | |
|---|---|---|
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | F eddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Co lens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 * | 8/2003 | Ruffner ................ A01B 69/008 318/581 |
| 6,615,108 B1 | 9/2003 | Peless et al. |
| 6,658,693 B1 | 12/2003 | Reed, Jr. |
| 6,661,239 B1 | 12/2003 | Ozick |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| 6,901,624 B2 | 6/2005 | Mori et al. |
| D510,066 S | 9/2005 | Hickey et al. |
| 6,938,298 B2 | 9/2005 | Aasen |
| 6,940,291 B1 | 9/2005 | Ozick |
| 6,956,348 B2 | 10/2005 | Landry et al. |
| 6,971,140 B2 | 12/2005 | Kim |
| 6,984,952 B2 | 1/2006 | Peless et al. |
| 6,999,850 B2 | 2/2006 | McDonald |
| 7,024,278 B2 | 4/2006 | Chiapetta et al. |
| 7,069,124 B1 | 6/2006 | Whittaker et al. |
| 7,076,348 B2 * | 7/2006 | Bucher ................ E01C 19/004 701/29.4 |
| 7,085,624 B2 | 8/2006 | Aldred et al. |
| 7,103,457 B2 * | 9/2006 | Dean .................... A01D 34/008 318/568.12 |
| 7,110,881 B2 * | 9/2006 | Gray ...................... G01C 21/00 340/995.19 |
| 7,155,309 B2 | 12/2006 | Peless et al. |
| 7,203,576 B1 | 4/2007 | Wilson et al. |
| 7,206,677 B2 | 4/2007 | Hulden |
| 7,239,944 B2 * | 7/2007 | Dean .................... A01D 34/008 701/23 |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,729,801 B2 | 6/2010 | Abramson |
| 7,756,624 B2 * | 7/2010 | Diekhans ............. A01B 69/007 460/114 |
| 8,046,103 B2 * | 10/2011 | Abramson ........... A01D 34/008 367/103 |
| 8,069,639 B2 | 12/2011 | Fancher, III |
| D652,431 S | 1/2012 | Naslund |
| D656,163 S | 3/2012 | Johansson et al. |
| 8,136,333 B1 | 3/2012 | Levin et al. |
| 8,204,654 B2 * | 6/2012 | Sachs .................... A01B 79/005 700/1 |
| 8,239,083 B2 * | 8/2012 | Durkos ................ G05D 1/0219 700/245 |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,666,550 B2 * | 3/2014 | Anderson ............ A01D 34/008 700/253 |
| 8,781,627 B2 | 7/2014 | Sandin et al. |
| 8,868,237 B2 | 10/2014 | Sandin et al. |
| 8,938,318 B2 | 1/2015 | Bergstrom |
| 8,954,193 B2 | 2/2015 | Sandin et al. |
| 9,008,918 B2 * | 4/2015 | Missotten ............. A01B 69/007 701/466 |
| 9,020,757 B2 * | 4/2015 | Peake .................. B62D 15/025 180/204 |
| 9,043,951 B2 * | 6/2015 | Tolstedt ................ A01C 21/005 |
| 9,072,218 B2 * | 7/2015 | Johnson ............... A01D 34/008 |
| 9,137,943 B2 * | 9/2015 | Einecke ............... A01D 75/185 |
| 9,168,922 B1 * | 10/2015 | Martin ............. B60W 30/0953 |
| 9,181,660 B2 * | 11/2015 | Fritz ....................... E01C 19/00 |
| 9,258,942 B2 * | 2/2016 | Biber ................... G05D 1/0219 |
| 2001/0022506 A1 | 9/2001 | Peless et al. |
| 2001/0047231 A1 | 11/2001 | Peless et al. |
| 2002/0011813 A1 | 1/2002 | Koselka et al. |
| 2002/0016649 A1 | 2/2002 | Jones |
| 2002/0120364 A1 | 8/2002 | Co lens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0173877 A1 | 11/2002 | Zweig |
| 2003/0018423 A1 * | 1/2003 | Saller .................... A01B 79/005 701/50 |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0144774 A1 * | 7/2003 | Trissel ................ A01D 34/008 701/23 |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino et al. |
| 2004/0010343 A1 * | 1/2004 | Dean .................... A01D 34/008 700/245 |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |

(56) References Cited

U.S. PATENT DOCUMENTS

| | | |
|---|---|---|
| 2004/0111184 A1 | 6/2004 | Chiappetta et al. |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Co lens |
| 2004/0193348 A1* | 9/2004 | Gray ............... A01B 69/008 701/50 |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |
| 2005/0010331 A1 | 1/2005 | Taylor et al. |
| 2005/0020374 A1 | 1/2005 | Wang |
| 2005/0038578 A1* | 2/2005 | McMurtry ........... A01D 34/008 701/25 |
| 2005/0097952 A1 | 5/2005 | Steph |
| 2005/0108999 A1 | 5/2005 | Bucher |
| 2005/0113990 A1 | 5/2005 | Peless et al. |
| 2005/0156562 A1 | 7/2005 | Cohen et al. |
| 2005/0197766 A1* | 9/2005 | Flann ................ A01B 79/005 701/533 |
| 2005/0204717 A1 | 9/2005 | Colens |
| 2005/0251292 A1 | 11/2005 | Casey et al. |
| 2005/0278094 A1 | 12/2005 | Swinbanks et al. |
| 2005/0287038 A1 | 12/2005 | Dubrovsky et al. |
| 2006/0090438 A1* | 5/2006 | Hunt ................... A01D 34/008 56/10.2 A |
| 2006/0175541 A1* | 8/2006 | Eglington ............ G05D 1/0221 250/221 |
| 2006/0293794 A1 | 12/2006 | Harwig et al. |
| 2007/0016328 A1 | 1/2007 | Ziegler et al. |
| 2007/0142964 A1 | 6/2007 | Abramson |
| 2007/0150109 A1 | 6/2007 | Peless et al. |
| 2008/0039974 A1* | 2/2008 | Sandin ................ G05D 1/028 700/258 |
| 2008/0039991 A1* | 2/2008 | May ..................... G05D 1/024 701/25 |
| 2008/0049217 A1* | 2/2008 | Cappelletti ......... A01D 34/008 356/141.3 |
| 2008/0097645 A1 | 4/2008 | Abramson et al. |
| 2008/0109126 A1* | 5/2008 | Sandin ................ G05D 1/028 701/23 |
| 2008/0167753 A1* | 7/2008 | Peless ................ G05D 1/0219 700/253 |
| 2008/0183349 A1 | 7/2008 | Abramson et al. |
| 2009/0254218 A1 | 10/2009 | Sandin et al. |
| 2010/0059000 A1 | 3/2010 | Bergquist |
| 2010/0102525 A1 | 4/2010 | Fancher |
| 2010/0324731 A1* | 12/2010 | Letsky ................ A01D 34/008 700/245 |
| 2011/0130875 A1 | 6/2011 | Abramson |
| 2011/0167574 A1* | 7/2011 | Stout .................... G05D 1/0219 15/3 |
| 2011/0202224 A1* | 8/2011 | Thompson ......... G05D 1/0227 701/26 |
| 2011/0234153 A1 | 9/2011 | Abramson |
| 2011/0295424 A1* | 12/2011 | Johnson ............ A01D 34/008 700/248 |
| 2012/0041594 A1 | 2/2012 | Abramson et al. |
| 2012/0212638 A1* | 8/2012 | Schepelmann ....... A01D 34/008 348/222.1 |
| 2012/0226381 A1 | 9/2012 | Abramson et al. |
| 2013/0006419 A1* | 1/2013 | Bergstrom .......... A01D 34/008 700/245 |
| 2013/0030609 A1 | 1/2013 | Jagenstedt |
| 2013/0041526 A1 | 2/2013 | Ouyang |
| 2013/0066484 A1* | 3/2013 | Markusson ......... A01D 34/008 701/2 |
| 2013/0076304 A1 | 3/2013 | Andersson et al. |
| 2013/0110322 A1 | 5/2013 | Jagenstedt et al. |
| 2013/0152538 A1 | 6/2013 | Fiser et al. |
| 2013/0184924 A1 | 7/2013 | Jagenstedt et al. |
| 2013/0249179 A1 | 9/2013 | Burns |
| 2013/0274920 A1 | 10/2013 | Abramson et al. |
| 2014/0102061 A1 | 4/2014 | Sandin et al. |
| 2014/0102062 A1 | 4/2014 | Sandin et al. |
| 2014/0117892 A1 | 5/2014 | Coates |
| 2015/0006015 A1 | 1/2015 | Sandin et al. |

FOREIGN PATENT DOCUMENTS

| | | |
|---|---|---|
| EP | 0792726 | 9/1997 |
| EP | 1331537 | 7/2003 |
| EP | 1704766 | 12/2008 |
| FR | 2828589 | 2/2003 |
| GB | 2142447 | 1/1985 |
| GB | 2283838 | 5/1995 |
| GB | 2382157 | 5/2003 |
| JP | 62120510 | 6/1987 |
| JP | 62154008 | 7/1987 |
| JP | 63183032 | 7/1988 |
| JP | 63241610 | 10/1988 |
| JP | 2-6312 U | 1/1990 |
| JP | 3051023 | 3/1991 |
| JP | 04320612 | 11/1992 |
| JP | 06327598 | 11/1994 |
| JP | 07129239 | 5/1995 |
| JP | 7295636 | 11/1995 |
| JP | 816776 | 1/1996 |
| JP | 08089451 | 4/1996 |
| JP | 8152916 | 6/1996 |
| JP | 09179625 | 7/1997 |
| JP | 9185410 | 7/1997 |
| JP | 11-508810 | 8/1999 |
| JP | 11-510935 | 9/1999 |
| JP | 2001-258807 | 9/2001 |
| JP | 2001-275908 | 10/2001 |
| JP | 2001-525567 | 12/2001 |
| JP | 2002078650 | 3/2002 |
| JP | 2002-204768 | 7/2002 |
| JP | 2002-532178 | 10/2002 |
| JP | 3356170 | 10/2002 |
| JP | 2002-323925 | 11/2002 |
| JP | 3375843 | 11/2002 |
| JP | 2002-355206 | 12/2002 |
| JP | 2002-360471 | 12/2002 |
| JP | 2002-360482 | 12/2002 |
| JP | 2003005296 | 1/2003 |
| JP | 2003010076 | 1/2003 |
| JP | 2003-505127 | 2/2003 |
| JP | 2003036116 | 2/2003 |
| JP | 2003038401 | 2/2003 |
| JP | 2003038402 | 2/2003 |
| JP | 2003061882 | 3/2003 |
| JP | 2003-310489 | 11/2003 |
| WO | 95/26512 | 10/1995 |
| WO | 97/40734 | 11/1997 |
| WO | 97/41451 | 11/1997 |
| WO | 98/53456 | 11/1998 |
| WO | 99/16078 | 4/1999 |
| WO | 99/28800 | 6/1999 |
| WO | 99/38056 | 7/1999 |
| WO | 99/38237 | 7/1999 |
| WO | 99/59042 | 11/1999 |
| WO | 00/04430 | 1/2000 |
| WO | 00/36962 | 6/2000 |
| WO | 00/38026 | 6/2000 |
| WO | 00/38029 | 6/2000 |
| WO | 00/78410 | 12/2000 |
| WO | 01/06904 | 2/2001 |
| WO | 01/06905 | 2/2001 |
| WO | 02/39864 | 5/2002 |
| WO | 02/39868 | 5/2002 |
| WO | 02/058527 | 8/2002 |
| WO | 02/062194 | 8/2002 |
| WO | 02/067744 | 9/2002 |
| WO | 02/067745 | 9/2002 |

(56) References Cited

FOREIGN PATENT DOCUMENTS

| WO | 02/074150 | 9/2002 |
|---|---|---|
| WO | 02/075356 | 9/2002 |
| WO | 02/075469 | 9/2002 |
| WO | 02/075470 | 9/2002 |
| WO | 02/101477 | 12/2002 |
| WO | 03/026474 | 4/2003 |
| WO | 03/040845 | 5/2003 |
| WO | 03/040846 | 5/2003 |
| WO | 03/065140 | 8/2003 |
| WO | 2004/004533 | 1/2004 |
| WO | 2004/006034 | 1/2004 |
| WO | 2004/058028 | 7/2004 |
| WO | 2005/055795 | 6/2005 |
| WO | 2005/077244 | 8/2005 |
| WO | 2006/068403 | 5/2006 |

OTHER PUBLICATIONS

'Electroluxusa.com' [online]. "Designed for the well-lived home," Retrieved from the Internet: URL<http://www.electroluxusa.com/node57.asr[currentURL=node142.asp%3F >. Accessed Mar. 2005, 2 pages.

'Everyday Robots.com' [online]. "Everyday Robots: Reviews, Discussion and News for Consumers," Aug. 2004, Retrieved from the Internet: URL<www.everydayrobots.com/index.php?option=content&task=view&id=9>, accessed Sep. 2012, 4 pages.

'i4u.com' [online]. "Hitachi: News release: The home cleaning robot of the autonomous movement type (experimental machine)," May 2003, Retrieved from the Internet: URL<www.i4u.com/japanreleases/hitachirobot.htm>, accessed Mar. 2005, 5 pages.

'therobomaid.com' [online]. "RoboMaid Sweeps Your Floors So You Won't Have to, the Official Site," Retrieved from the Internet: URLhttp://therobomaid.com/, accessed Mar. 2005, 2 pages.

'TrilobiteElectrolux' [online]. "Facts on Trilobite," Retrieved from the Internet: URL<http://trilobiteelectroluxse/presskit_en/model11335.asp?print=ves&pressID=>, accessed Dec. 2003, 2 pages.

'www.acomputeredge.com' [online]. "Put Your Roomba . . . On, 'Automatic,'" Retrieved from the Internet at URL http://www.acomputeredge.com/roomba, accessed Apr. 2005, 3 pages.

'www.karcherusa.com' [online]. "Karcher USA, RC3000 Robotic Cleaner," 2005, Retrieved from the internet: URL http://www.karcher-usa.com/showproducts.php?op=viewprod&paraml=143&param2=&param3=, accessed Mar. 2005, 3 pages.

'www.onrobo.com' [online]. "On Robo, Robot Reviews Samsung Robot Vacuum (VC-RP30W)," 2005, Retrieved from the Internet: URLwww.onrobo.com/reviews/AT_Home/vacuum_cleaners/on00vcrb30rosam/index.htm, accessed Mar. 2005, 2 pages.

'www.robocleaner.de' [online]. "Karcher RoboCleaner RC 3000," Retrieved from the Internet: URLwww.robocleaner.de/english/screen3.html, accessed Dec. 2003, 4 pages.

'www.sharperimage.com' [online]. "Robotic Vacuum Cleaner-Blue," 2005, Retrieved from the internet at URL http://www.sharperimage.com/us/en/catalog/productview.jhtml?sku=S1727BLU, accessed Mar. 2005, 2 pages.

'www.therobotstore.com' [online]. "Friendly Robotics Robotic Vacuum RV400-The Robot Store," Retrieved from the Internet at URLwww.therobotstore.com/s.nl/sc.9/category.-109/it.A/id.43/.f, Apr. 2005, 1 page.

Angle et al., U.S. Appl. No. 60/177,703, filed Jan. 24, 2000, available at http://portaluspto.gov/external/portal/pair , accessed Jul. 11, 2012, 16 pages.

Bohn et al. "Super-distributed RFID Tag Infrastructures," Lecture Notes in Computer Science, Springer Verlag, Berlin, DE, vol. 3295, Nov. 11, 2004, pp. 1-12.

Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 113 pages.

Caracciolo et al., "Trajectory Tracking Control of a Four-wheel Differentially Driven Mobile Robot," IEEE Int. Conf. Robotics and Automation, Detroit, MI, 1999, pp. 2632-2638.

Casey et al., U.S. Appl. No. 60/582,992, filed Jun. 25, 2004, available at http://portal.uspto.gov/external/portal/pair, accessed Jul. 11, 2012, 24 pages.

Domnitcheva "Smart Vacuum Cleaner an Autonomous Location-Aware Cleaning Device," Proceedings of the International Conference on Ubiquitous Computing, Sep. 10, 2004, pp. 1-2.

Doty et al., "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.

eVac Robotic Vacuum S1727 Instruction Manual, Sharper Image Corp, Copyright 2004, 13 pages.

Evolution Robotics, "NorthStar—Low-cost Indoor Localiztion—How it Works," E Evolution Robotics, 2 pages, 2005.

Final Office Action issued in U.S. Appl. No. 11/688,225, dated Nov. 10, 2011, 15 pages.

Gat, "Robust Low-Computation Sensor-driven Control for Task-Directed Navigation," Proc of IEEE International Conference on Robotics and Automation , Sacramento, Apr. 1991, pp. 2484-2489.

Hicks et al., "A Survey of Robot Lawn Mowers," 2000, accessed via http://www.robotics.uc.edu/papers/paper2000/lawnmower.pdf, accessed 2012, 8 pages.

International Preliminary Report on Patentability dated Sep. 23, 2008 from International Application No. PCT/US2007/064323, 10 pages.

International Preliminary Report on Patentability dated Sep. 23, 2008 from International Application No. PCT/US2007/064326, 10 pages.

International Search Report and Written Opinion in International Application No. PCT/US2015/050482, dated Dec. 14, 2015, 10 pages.

International Search Report and Written Opinion issued in PCT/US2007/064326, dated Jul. 17, 2008, 6 pages.

International Search Report and Written Opinion issued in PCT/US2007/064323, dated Jun. 16, 2008, 14 pages.

Invitation to Pay Additional Fees issued in International Application No. PCT/US2007/064326, dated Apr. 18, 2008, 9 pages.

Kahney, "Wired News: Robot Vacs are in the House," Jun. 2003, Retrieved from the Internet: URLwww.wired.com/news/technology/o.1282.59237,00.html, accessed Mar. 2005, 5 pages.

Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.

Karcher, "Product Manual Download 'Karch'," available at www.karcher.com, 16 pages, 2004.

Kimura and Shimizu, "Stuck Evasion Control for Active Wheel Passive-Joint Snake-like Mobile Robot 'Genbu'," Proceedings of the 2004 IEEE International Conference on Robotics 8 Automation New Orleans, LA Apr. 2004, pp. 5087-5092.

KOOLVAC Robotic Vacuum Cleaner Owner's Manual, Koolatron, 2004, 13 pages.

Kozlowski and Pazderski. "Modeling and Control of a 4-wheel Skid-steering Mobile Robot," International J. of Applied Mathematics and Computer Science, 2004, 14:477-496.

Kubitz et al, "Application of radio frequency identification devices to support navigation of autonomous mobile robots" Vehicular Technology Conference, vol. 1, May 4, 1997, pp. 126-130.

Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.

Morland,"Autonomous Lawnmower Control, " Downloaded from the internet at: http://cns.bu.edu/~cjmorlan/robotics/lawnmower/report.pdf, Jul. 2002, 10 pages.

Non-final Office Action issued in U.S. Appl. No. 11/688,213, dated Jan. 27, 2011, 27 pages.

Non-final Office Action issued in U.S. Appl. No. 11/688,225, dated Feb. 24, 2011, 30 pages.

Non-final Office Action issued in U.S. Appl. No. 12/488,094, dated Jan. 26, 2011, 25 pages.

(56) References Cited

OTHER PUBLICATIONS

Non-final Office Action issued in U.S. Appl. No. 12/488,094, dated Jul. 28, 2011, 13 pages.
Schofield, "Neither Master nor slave—A Practical Study in the Development and Employment of Cleaning Robots, Emerging Technologies and Factory Automation," 1999 Proceedings ETFA '99 1999 7th IEEE International Conference on Barcelona, Spain, Oct. 1999, pp. 1427-1434.
Thrun, "Learning Occupancy Grid Maps With Forward Sensor Models," Autonomous Robots 15, Sep. 1, 2003, 28 pages.
Wigley, "The Electric Lawn", in *The American Lawn*, Princeton Architectural Press New York with Canadian Centre for Architecture Montreal, 1999, pp. 155-195.
International Preliminary Report on Patentability in International Application No. PCT/US2015/050482, dated Jun. 27, 2017, 7 pages.

\* cited by examiner

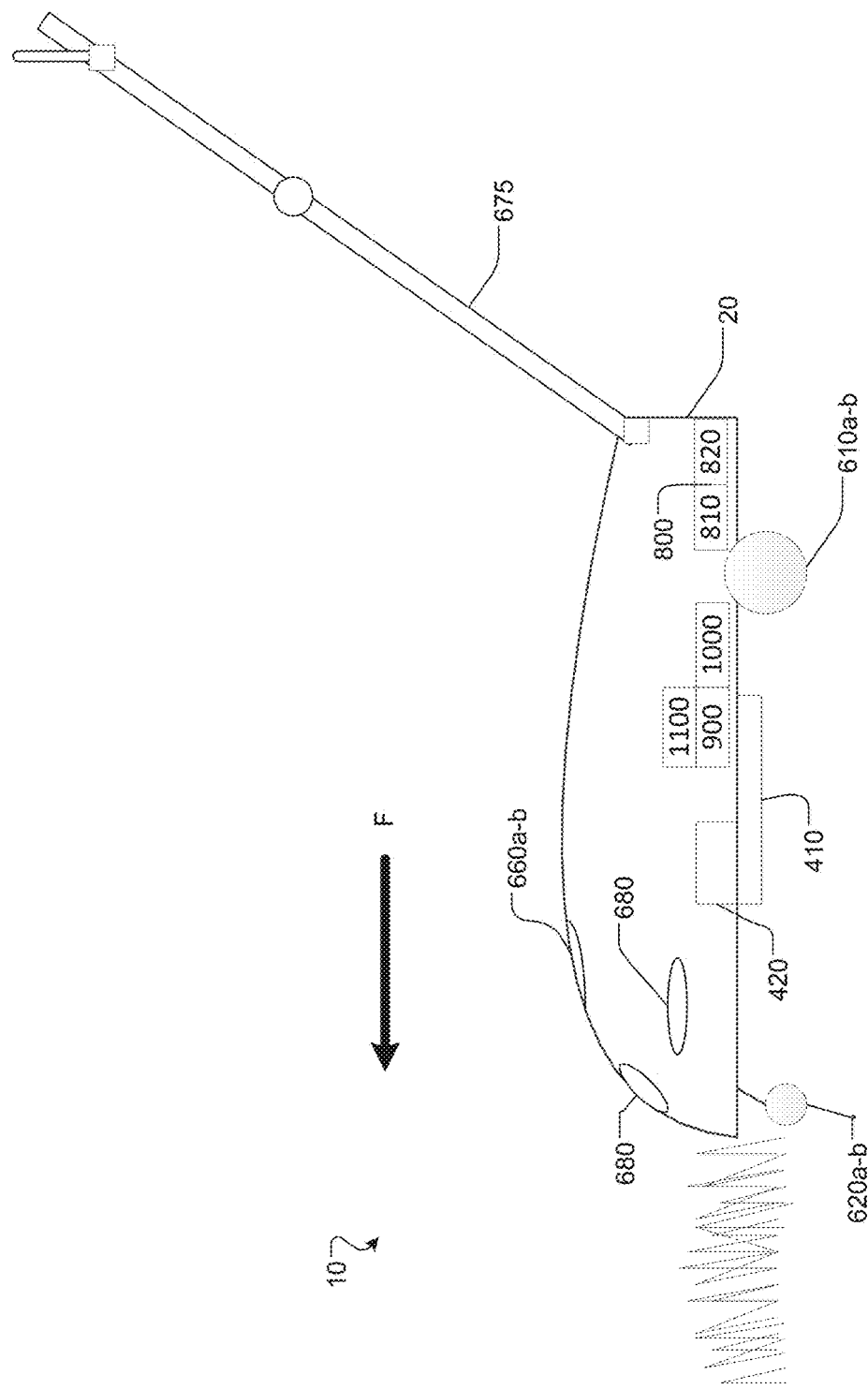

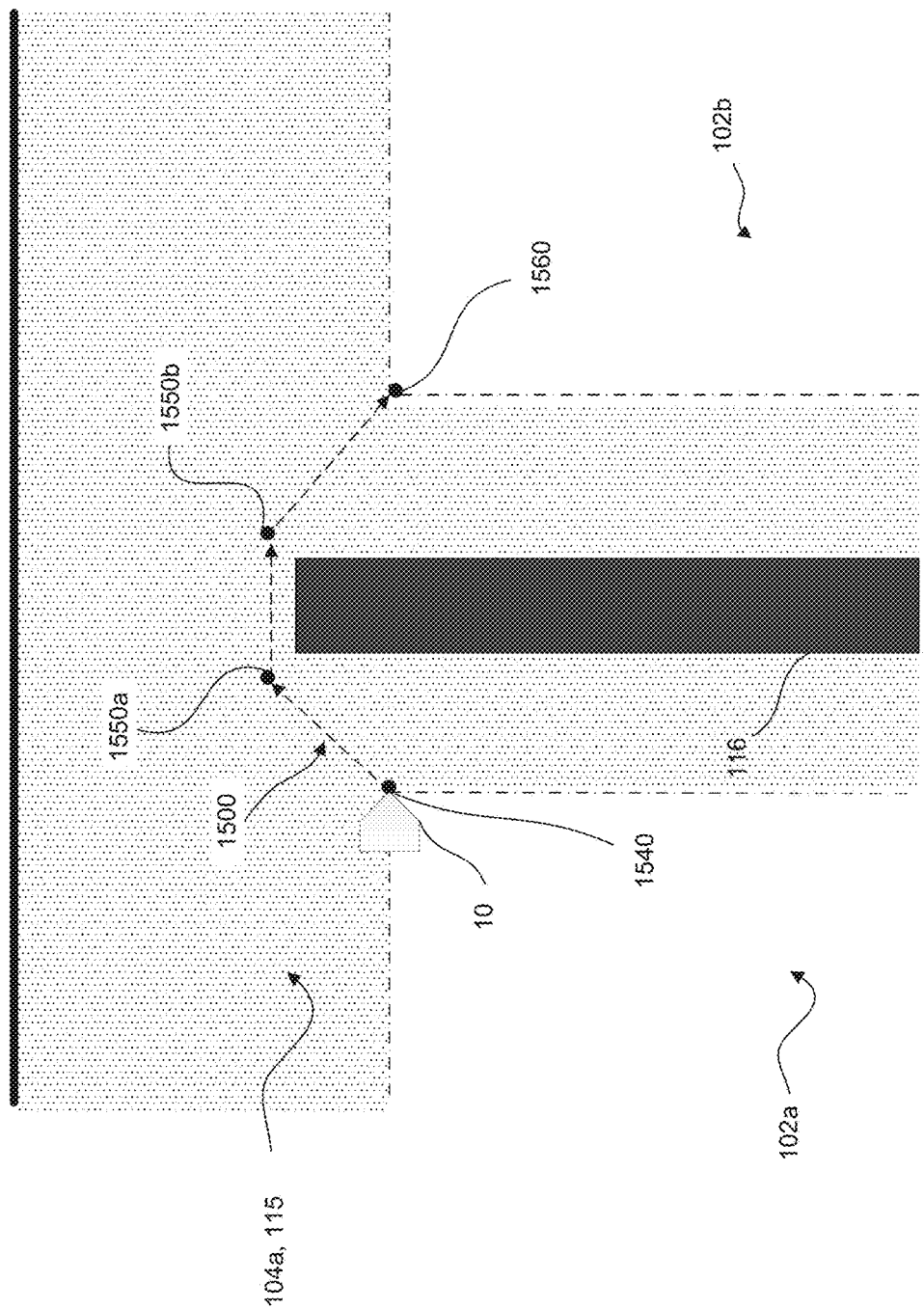

ROBOTIC MOWING OF SEPARATED LAWN AREAS

CROSS-REFERENCE TO RELATED APPLICATIONS

This application is a continuation application of and claims priority to U.S. application Ser. No. 14/579,080, filed on Dec. 22, 2014, the entire contents of which are hereby incorporated by reference.

TECHNICAL FIELD

This invention relates to mowing lawn areas and other areas with an autonomous robot, and more particularly to mowing multiple, discontiguous areas.

BACKGROUND

Autonomous robots can be programmed to mow lawn areas. Care must be taken to keep such robots from mowing outside intended areas. Buried electrical wires often define lawn boundaries that the robots are programmed to not cross. Other forms of navigation have also been considered.

SUMMARY

One aspect of the invention features a method of mowing multiple areas separated by a space. The method includes training a robotic mower to mow the areas, including moving the robotic mower about the areas while storing data indicative of location of boundaries of each area relative to boundary markers. The method further includes training the robotic mower to move across the space separating the areas, including moving the robotic mower to a traversal launch point of a first of the areas, storing data indicative of location of the traversal launch point, moving the robotic mower to a traversal landing point of a second of the areas, and storing data indicative of location of the traversal landing point. Initiating a mowing operation causes the robotic mower to autonomously, and in sequence: mow the first of the areas, move to the traversal launch point, move from the traversal launch point across the space to the traversal landing point, and then mow the second of the areas.

In some examples, the method further includes training the robotic mower to move across a second space separating the second area from a third area to be mowed. The method may also include generating a 2D grid of cells representing one or more of the areas and the space, and assigning a value to each of the cells. The value indicates whether a particular cell is mowable. The value may also indicate whether the cell is on one or more of the boundaries. The value may indicate whether the cell is along a path between the traversal launch point and the traversal landing point.

In some examples, training of the robotic mower to move across the space separating the areas is performed after training the robotic mower to mow the first of the areas and before training the robotic mower to mow the second of the areas. The mower and each of the boundary markers may include a respective wideband transceiver that operates from a frequency of 5925 MHz to 7250 MHz. Training the robotic mower to move across the space can further include storing data indicative of at least one intermediate position along a path between the traversal launch point and the traversal landing point, and initiating the mowing operation may cause the robotic mower to move along the path through the intermediate position.

In some cases, initiating the mowing operation may cause the robotic mower to mow the first area according to a mowing pattern determined in part by a shape of the first area. The mowing pattern may be a corn row pattern, for example. Initiating the mowing operation may cause the robotic mower to automatically conclude the mowing operation after mowing the second of the areas, without again mowing within the first of the areas.

In some embodiments, the traversal launch point is on the boundary of the first area. The traversal landing point may be on the boundary of the second area.

In some implementations, during the mowing operation the mower moves in a straight line from the traversal launch point across the space to the traversal landing point. During the mowing operation, the robotic mower may automatically disable a mowing function while moving across the space and then may reactivate the mowing function in the second area.

Another aspect of the invention features a robotic mower with a wheeled chassis, a motorized grass cutter carried by the wheeled chassis, and a controller. The controller is configured to store data indicative of location of boundaries of each of at least two areas to be mowed, wherein the at least two areas are separated by a space not to be mowed, store data indicative of a traversal path across the space not to be mowed, wherein a traversal launch point of a first of the areas and a traversal landing point of a second of the areas are located along the traversal path, and control the robotic mower to perform a mowing operation. In a mowing operation, the robotic mower autonomously and in sequence mows the first of the areas, moves to the traversal launch point, moves from the traversal launch point across the space and along the traversal path to the traversal landing point, and mows the second of the areas.

In some examples, the controller is further configured to move the robotic mower in a straight line from the traversal launch point to the traversal landing point. The controller can be further configured to train the robotic mower to move across a second space separating the second area from a third area to be mowed. The controller can also be configured to automatically disable the grass cutter while the robotic mower moves along the traversal path, and to reactivate the grass cutter once the robotic mower is in the second area. The controller may store data indicative of at least one intermediate position along the traversal path, and wherein the mowing operation causes the robotic mower to move along the traversal path through the intermediate position.

The controller may be configured to generate a 2D grid of cells representing one or more of the areas and the space, and assign a value to each of the cells. The value may indicates whether a cell is mowable, for example. The value may further indicate whether the cell is on one or more of the boundaries. The value may also indicate whether the cell is along a path between the traversal launch point and the traversal landing point.

In some implementations of the robotic mower, the controller trains the robotic mower to move across the space separating the areas after the robotic mower is trained to mow the first of the areas and before the robotic mower is trained to mow the second of the areas. The robotic mower and each of the boundary markers may include a respective wideband transceiver that operates from a frequency of 5925 MHz to 7250 MHz., for example. The controller may store data indicative of at least one intermediate position along the traversal path, and the mowing operation may involve the robotic mower moving along the path through the intermediate position.

Many lawns are not regularly shaped or composed of continuous grass regions. For example, a lawn may include multiple different mowable areas separated by a non-mowable area such as a path or driveway. In order to mow multiple discontiguous sections or areas of a lawn, the robot lawnmower described herein navigates between the separated lawn areas to mow the multiple areas.

In some examples, the robot includes a controller and sub-systems configured to guide the robot to traverse non-mowable areas separating a first lawn area from a second lawn area. In some cases the robot controls its sub-systems such that the cutting system is operable during a mowing operation and not operable during traversal of the non-mowable areas between lawn areas and bypass of a lawn area to travel to another lawn area. As a result, a single robot can be used to care for two or more physically separate lawn areas.

The system may further allow for automated methods, manual methods, or a selectable combination of automated and manual methods of training routes that the robot takes to complete mowing, bypass, and traversal operations and move between the lawn areas. The automated methods may include optimization techniques to increase efficiency of mowing operations. The user may also have the flexibility to override the automated methods with manual training methods.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1B is a schematic side view of the robot of FIG. 1A.

FIGS. 5A and 5B are schematics illustrating methods of teaching traversal routes of the traversal regions to the robot.

FIG. 9 is a flowchart for an example method of training the robot.

FIG. 10A-B are flowcharts for examples of operating the robot.

Like reference symbols in the various drawings indicate like elements.

DETAILED DESCRIPTION

The robotic lawnmower described below can mow discontiguous lawn areas as it autonomously moves about the lawn areas and crosses traversal regions or spaces that separate the lawn areas. The robot includes a cutting system with cutting blades to cut grass on the lawn areas as it moves along a lawn route (A "route" is hereby also referred to as a "path.") via a drive system with wheels that mobilizes the robot. The cutting system is decoupled from the drive system such that the robot can deactivate the cutting system while the drive system is running. For example, while the robot follows traversal routes across the traversal regions between the lawn areas, the robot can deactivate the cutting system.

A controller is coupled to a memory storage element that stores the behavior of robot during various operations and the schedules for mowing the discontiguous lawn areas. In some schedules, the robot can be programmed to mow a target lawn area that is separated from the robot's current location. The robot can be programmed to move along bypass routes across the lawn areas with the cutting system deactivated so that the robot can reach a target lawn area without mowing the lawn areas that are in between the location of the robot and the target lawn area. The memory storage element further stores, for example, data corresponding to points or segments along the lawn routes, the traversal routes, and the bypass routes. A combination of manual training by a user or automatic path planning by subroutines programmed on the robot determines the routes, and the memory storage element can data pertaining to the routes.

Figure 1A:
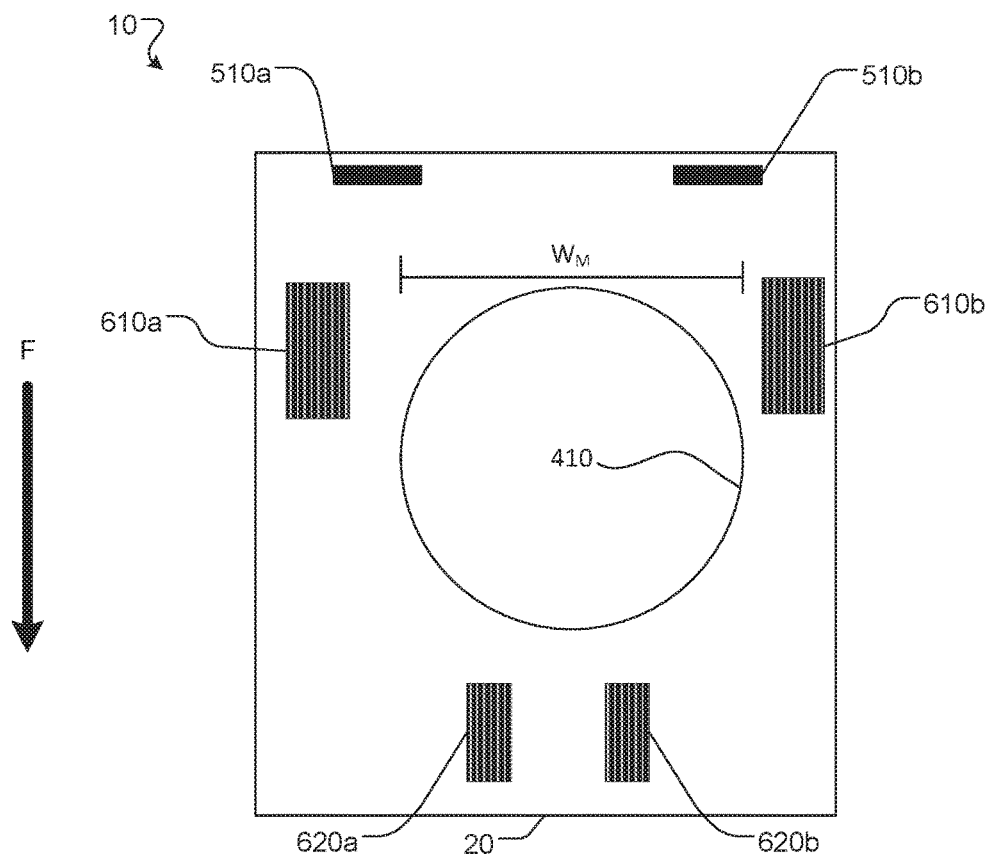
FIG. 1A is a schematic bottom view of an autonomous lawnmower robot.
Figure 1C:
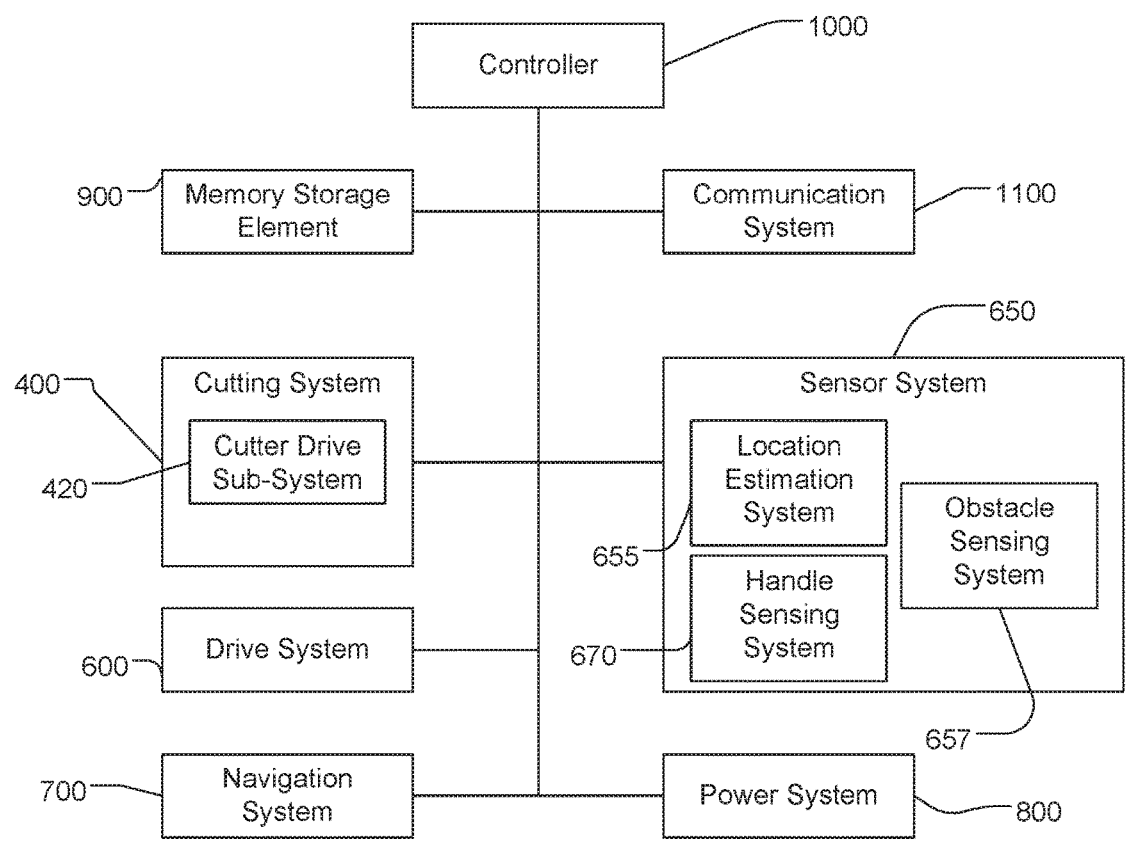
FIG. 1C is a block diagram of a control system of the robot of FIG. 1A.

FIGS. 1A-B are general schematic overviews of an example of the autonomous lawnmower robot 10, and FIG. 1C shows a block diagram of a control system that operates the autonomous lawnmower robot 10. FIG. 1A shows a schematic bottom view of the robot 10 with a forward direction F, which includes a main body 20 that contains wheel modules 610a-b of a drive system 600 (shown in FIG. 1C) and a cutter 410 of a cutting system 400 (shown in FIG. 1C).

The wheel modules 610a-b include the wheels, motor, and gearbox for driving the robot 10 in a forward or backward direction. The wheel modules 610a-b can be differentially operated such that the robot can turn based on a level of drive supplied to each wheel. The drive system 600 further includes caster wheels 620a-b that partially supports the weight of the robot 10.

The cutter 410 is, for example, rotatable reciprocating blades that can cut grass as a cutter drive sub-system 420 (shown in FIG. 1C) drives the cutter 410 to rotate. The cutter 410 has a mowing width $W_M$ that defines the width of grass that the robot 10 cuts as the robot 10 moves over uncut grass. The cutter drive sub-system 420 includes a high-power motor and a high-torque gearbox that operate the cutter 410 such that, at highest power, the motor, gearbox, and the cutter 410 can cut thick swaths of grass.

The bottom portion of the robot 10 can further include sensors part of a sensor system 650 (shown in FIG. 1C). These sensors may include cut edge sensors 510a-b that differentiate between cut grass and uncut grass, grass height sensors that measure the height of grass beneath the robot 10, and cliff sensors that detect drop-offs in the terrain underneath the robot 10.

FIG. 1B is a schematic side view of the exemplary robot 10. The robot 10 includes a power system 800 with a power source 810, a controller 1000, a communication system 1100, and a memory storage element 900. The controller 1000 controls the systems of the robot 10, which will be described in more detail later in reference to FIG. 1C. The power system 800 supplies power via the power source 810 to the other robot systems. The communication system 1100 allows the controller 1000 to wirelessly communicate with external computing devices, such a mobile device or webbased device. The communication system 1100 can include, for example, a Bluetooth transceiver and/or a WiFi transceiver.

The power system 800, which includes a power source 810, provides power to the systems operable with the robot. The power source 810 is adjustable such that the power system 800 can provide a percent of full power. A charging system 820 within the power system 800 is connectable to an external charging dock to charge the power source 810.

The sensor system 650 (shown in FIG. 1C) of the robot 10 further includes a location estimation system 655 (shown in FIG. 1C). In some examples, the location estimation system 655 is a time-of-flight based system that uses a time-of-flight between a boundary marker (hereby also referred to as a "beacon" or a "marker") and the robot to determine the pose of the robot. For example, boundary markers may be placed along the boundary of the lawn. While the time-of-flight system uses markers that have been described as boundary markers, the marker can also be placed within or near the lawn to aid localization of the robot lawnmower. In some cases, the boundary markers send out a signal that the robot lawnmower interprets to determine its position relative to the boundary marker. In other examples, the boundary markers are passive and a radiation source on the robot lawnmower emits radiation that reflects off surfaces situated in the lawn area and is detected by a radiation detector on the robot. The localization can use triangulation to determine the robot position within the boundary. The signals sent between the boundary markers and the robot positioned on the property allow the robot to estimate the angles and the distance by calculating time of flight to each of the boundary markers, and using trigonometry to calculate the robot's current position. In another example, rather than use time-of-flight measurements, the system can triangulate the distance to an object using a fixed-angle laser pointer and a CMOS imager, with a known baseline between the two. In such examples, the pixel location of the received signal at the imager is indicative of the distance to the object. In some particular examples, the boundary markers are wideband transceivers in the 5,925 to 7,250 MHz range or ultra-wideband transceivers. However, other time-of-flight transceivers could be used.

Moreover, the sensor system 650 includes an obstacle sensing system 657 that further includes the proximity sensors 680 disposed on the lateral sides of the robot 10 such that the robot can detect when it has made contact with a physical barrier or when it is in close proximity to a physical barrier. The proximity sensors 680 can take the form of contact sensors (e.g. a sensor that detects an impact of a bumper on the robot with a physical barrier) and/or LIDAR (Light Detection And Ranging, which can entail optical remote sensing that measures properties of scattered light to find range and/or other information of a distant target) sensors that detect when the robot is in close proximity to nearby objects.

The sensor system 650 also includes a handle sensing system 670 (shown in FIG. 1C), which detects when a detachable handle 675 is attached to the robot 10. The detachable handle 675 is usable in a training mode as well as a mowing mode. Other sensors of the sensor system 650 include a global positioning system (GPS) as an additional means to determine the location of the robot 10, a tilt sensor to detect the level of the terrain beneath the robot, a rain sensor to detect water from, e.g. rain, that could damage the electromechanical components of the robot 10, and sensors and encoders operable with other systems to assist in control of the robot 10. Additionally or alternatively, the sensor system 650 can include, but not limited to, wheel drop sensors, sonar, radar, etc., infrared cliff sensors, a camera (e.g., volumetric point cloud imaging, three-dimensional (3D) imaging or depth map sensors, visible light camera and/or infrared camera), etc.

Referring to FIG. 1C, to achieve reliable and robust autonomous movement and cutting, the robot 10 includes the controller 1000 that operates the memory storage element 900, the communication system 1100, the cutting system 400, the sensor system 650, the drive system 600, the navigation system 700, and the power system 800. The cutting system 400 includes the cutter drive sub-system 420, which can comprise a motor and gearbox to drive the cutter. The sensor system 650 further includes the handle sensing system 670 and the location estimation system 655 as well as other sensors mentioned earlier. The controller 1000 operates the navigation system 700 configured to maneuver the robot 10 in a path or route stored in the memory storage element 900 across the lawn areas and/or traversal regions. The navigation system 700 is a behavior-based system executed on the controller 1000. The navigation system 700 communicates with the sensor system 650 to determine and issue drive commands to the drive system 600. In particular, the controller includes obstacle detection and avoidance methods and behaviors implemented in response to sensor signals from the obstacle sensing system 657. The robot can use its proximity sensors to detect the general geometry of an obstacle in the general vicinity in front of the robot 10 so that the robot 10 can determine what direction to turn. For example, using proximity sensors 680 disposed on the front portion of the robot 10, the controller 1000 can determine when the robot is about to collide with an obstacle and communicate instructions to the navigation system 700 and the drive system 600 to avoid the obstacle.

The memory storage element 900 stores data pertaining to operations—such as mowing operations or traversal operations—and the subroutines of the robot that can be implemented for, for example, training or mowing operations. The data further includes lawn route data, traversal route data, bypass route data, path behavior data, and scheduling data all of which will be described in more detail later. The controller 1000 communicates with the memory storage element 900 to determine which systems to activate or deactivate during an operation. A system (e.g. the cutting system 400, the drive system 600, the power system 800) can be activated at a level from 0% (e.g., off) to 100%. The memory storage element 900 includes data associated with a level of activation for an operation. For example, in some operations such as traversal operations, the controller 1000 activates the power system 800 at a 50% activation level due to lower power requirements for the traversal operations. The controller 1000 can have a high power mode (e.g. 75%-100% activation level of the power system 800) to accommodate greater mechanical stresses in the cutting system 400 when mowing large and thick swaths of grass.

The electromechanical systems, including sensing, cutting, drive, navigation, power, communication systems, disclosed and illustrated herein may include the additional elements and features as disclosed in U.S. patent application Ser. No. 11/688,213, filed Mar. 19, 2007, titled "Robot Confinement," the disclosure of which is incorporated by reference herein in its entirety.

In general, many lawns are irregularly shaped or composed of discontinuous grass regions. For example, a lawn may include multiple different mowable areas separated by a non-mowable area such as a path or driveway. In order to mow multiple discontiguous sections or areas of a lawn, the robot lawnmower described herein navigates between the separated lawn areas to mow the multiple areas.

Figure 2:
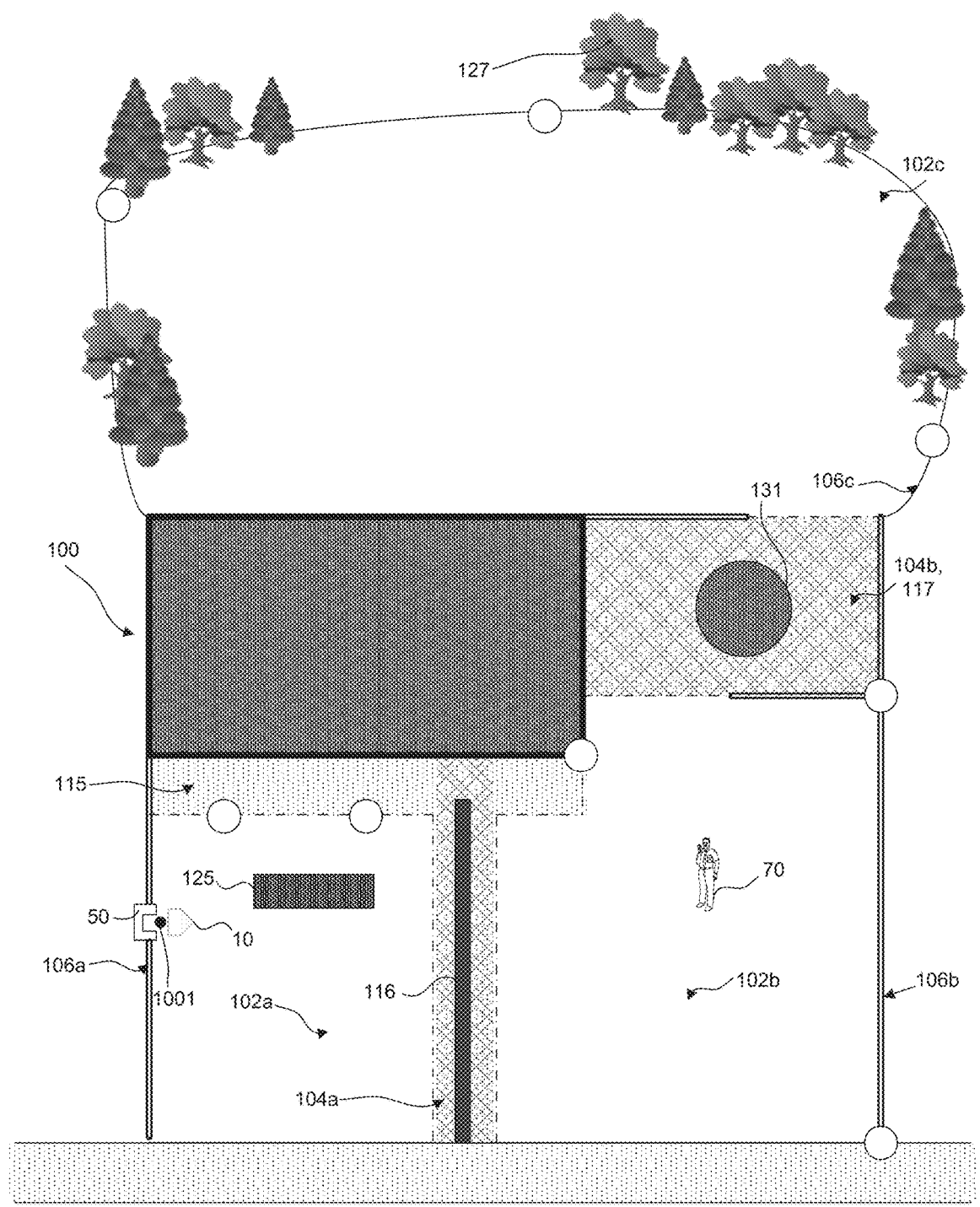
FIG. 2 is a schematic of an example set of discontiguous lawn areas with traversal regions that separate the discontiguous lawn areas.

FIG. 2 depicts a schematic view of an example of a property 100 with three discontiguous lawn areas 102a-c. The lawn areas 102a-c have boundaries 106a-c, respectively. A traversal region 104a separates the lawn area 102a and the lawn area 102b, and a traversal region 104b separates the lawn area 102b and the lawn area 102c. The lawn area 102a has a rose garden 125, which is an un-mowable feature (e.g., a keep-out or non-mowable space within the boundary of area 102a). The traversal region 104a includes a concrete walkway 115 that separates the lawn area 102a from the lawn area 102b and a floral divider 116 within the concrete walkway 115. Thus, if the robotic lawn mower is to mow both lawn area 102a and area 102b, it must cross the concrete walkway 115 in a region free of the floral divider 116. The lawn area 102c has an amorphous shape with trees 127 located at segments of the boundary 106c. The traversal region 104b is a rocky area 117 that includes a circular fire pit 131. Thus, to navigate between lawn area 102b and lawn area 102c, the robot must traverse region 104b while avoiding the fire pit 131.

The robot 10, shown parked at a charging dock 50, mows the lawn areas 102a-c according to a schedule pre-determined by the user. The charging dock 50 restores the power source (described earlier) of the robot 10 and also serves as a launch point 1001 for route data that the robot stores (described later in more detail). The robot 10 can move from one lawn area to another via the traversal regions 104a-b.

Figure 3:
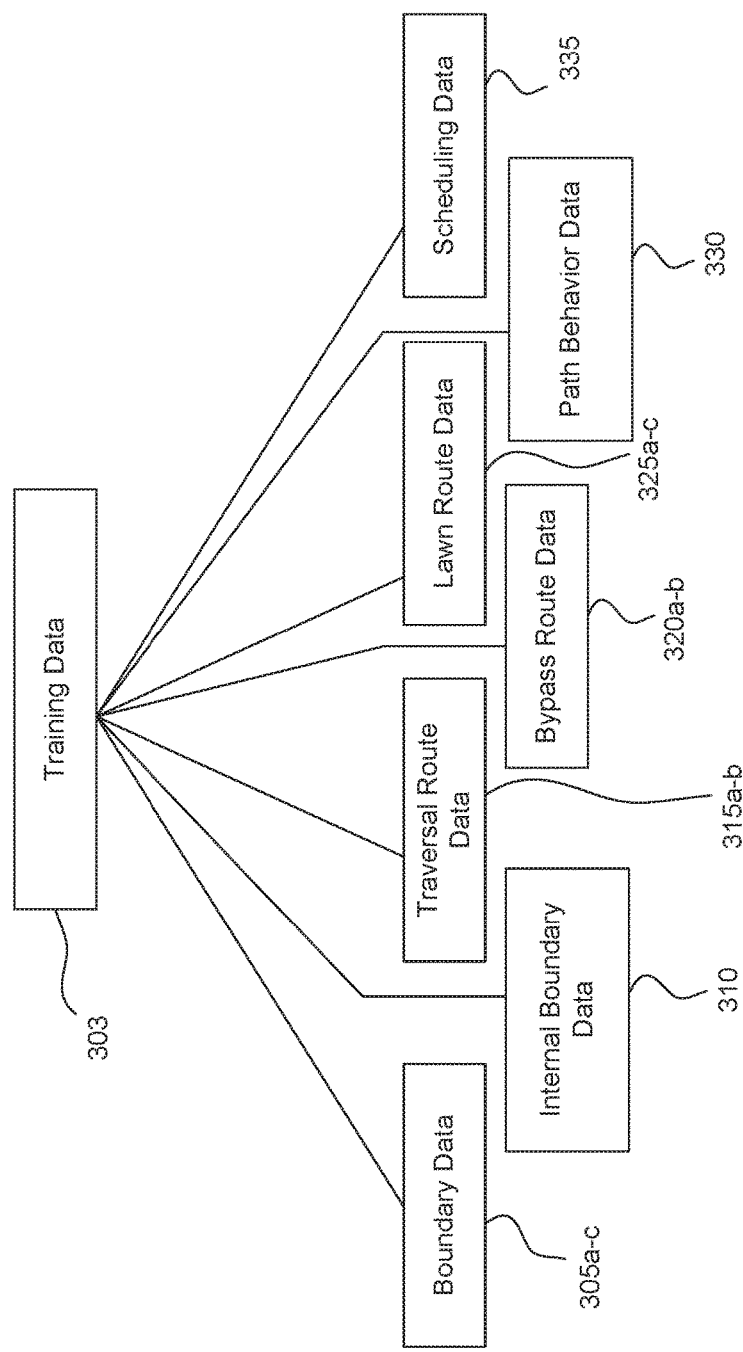
FIG. 3 is a block diagram of a memory structure of the robot of FIG. 2.

FIG. 3 shows an example of training data 303 stored in the memory storage element 900 (depicted in FIG. 1C) that the robot can execute to mow a discontiguous set of lawn areas. To train the robot 10, as will be discussed later, the training data 303 can be generated in automated methods, manual methods, or a combination of the two methods. The training data 303 includes boundary data 305, internal boundary data 310, traversal route data 315, bypass route data 320, lawn route data 325, path behavior data 330, and scheduling data 335. The controller 1000 (depicted in FIG. 1C) can process and execute at least some of the training data 303 to move about lawn areas and traversal regions and mow target lawn areas.

The boundary data 305 is the set of points that bounds a lawn area. Referring briefly back to FIG. 2, the boundary 106a-c of the lawn areas 102a-c can be represented by a set of discrete points stored as the boundary data 305a-c, respectively, or as a set of labelled cells in a Cartesian grid, which will be described in more detail later. From the boundary data 305, the controller can determine geometric characteristics of the lawn area, including length, width, area, and shape.

The internal boundary data 310 is the set of points that bound obstacles that cannot be traversed. The internal boundary data 310 defines the keep-out zones within a mowable area where the robot lawn mower should not mow. For example, referring briefly back to FIG. 2 again, the rose garden 125 and the fire pit 131 can be represented by a set of discrete points stored as the internal boundary data 310.

The traversal route data 315, the bypass route data 320, and the lawn route data 325 each include a set of points. Each point stored in the traversal route data 315, the bypass route data 320, and the lawn route data 325 includes one or more locations (e.g. X-, Y-coordinates measured from one or more datum points). As will be described in greater detail later, the one or more datum points can correspond to locations relative to boundary markers placed along the boundary. The locations of the boundary markers serve as reference points for other points stored in the boundary data 305, the traversal route data 315, the bypass route data 320, and the lawn route data 325. Locations of points herein are generally measured relative to a coordinate system established relative to the boundary markers.

The controller can use the route data 315, 320, 325 to generate one or more paths of movements that the robot 10 follows as it executes mowing, traversal, or bypass operations. The points and the orientation angle can be measured with respect to a Cartesian coordinate system, defined by for example, Cardinal directions and a reference point on the lawn. The points correspond to a position of the robot, and the orientation corresponds to the direction that the front of the robot is facing. The controller can control the drive system and navigation system such that the robot is placed into the position of the point and the orientation associated with that point. The controller uses the points of the route data 315, 320, 325 to generate routes to move about the lawn areas and traversal regions.

Referring also to FIG. 2, the traversal route data 315 includes traversal route data 315a and traversal route data 315b for the traversal region 104a and the traversal region 104b, respectively. Generally, during a traversal operation, a robot starts on the boundary of a first lawn area, follows a route that crosses a traversal region, and ends on a second lawn area. In the example of FIG. 2, the controller uses the points stored in the traversal route data 315a to generate a traversal route for the robot to move from the lawn area 102a across the traversal region 104a to arrive at the lawn area 102b. The controller uses the points stored in the traversal route data 315b to generate a traversal route for the robot to move from the lawn area 102b across the traversal region 104b to arrive at the lawn area 102c. Traversal route data includes at least a traversal launch point and a traversal landing point. The traversal launch and landing points can be geolocations or positions (e.g., X, Y positions in a coordinate system) relative to the boundary markers. Traversal route data can further include intermediate traversal points.

The traversal launch points generally correspond to an end point of a first lawn route; the intermediate traversal points generally correspond to points in the traversal region where the robot travels (e.g., the path or the route); and the traversal landing points generally correspond to a start point of a second lawn route. The first lawn route terminates at a first interface between the first lawn area and the traversable region. The first interface is defined by a subset of points of the boundary data for the first lawn area.

The intermediate traversal points within the traversal route correspond to points that the robot follows while traversing the area. The intermediate traversal points can further correspond to other changes in behavior of the systems of the robot, such as the drive system, the power system, the navigation system, etc. For example, the controller could increase the power level at the intermediate traversal point in order to compensate for a change in terrain at the intermediate traversal point. The terrain could be more difficult for the robot to traverse after crossing the intermediate traversal point, and it would thus be beneficial to increase the power level of the power system. The intermediate traversal routes can include one or more additional intermediate points that, with the intermediate traversal points, can define line geometries that can be represented by two or more points. For example, two intermediate traversal points and an intermediate point can define an arc.

The traversal landing point corresponds to the end of the traversal region and may additionally correspond to a start point of a second lawn route. The second lawn route can begin at a second interface between the second lawn area and the traversal region. The second interface is defined by a subset of points of the boundary data for the second lawn area. The traversal route data 305*a* includes a traversal launch point, intermediate traversal points, and a traversal landing point. The traversal route data 305*b* includes a traversal launch point, intermediate traversal points, an intermediate traversal route, and a traversal landing point. The points described above for the traversal route data 305*a-b* will be elaborated in more detail herein.

In some situations, it can be desirable to move to a different lawn area without first mowing the lawn area nearest to the robot docking station 50. In other situations, it can be beneficial to traverse a lawn area without mowing the area (e.g., to return to the docking station 50 from a separated lawn area). Bypass route data 320*a-b* provides a path for the robot lawnmower to follow to traverse a particular lawn area without mowing the area.

The bypass route data includes the bypass route data 320*a* for the lawn area 102*a* and the bypass route data 320*b* for the lawn area 102*b*. Also referring briefly to FIG. 2, the points stored in the bypass route data 320*a* allow the controller to generate a bypass route going from the launch point 1001 across the lawn area 102*a* to the start of the traversal route for the traversal region 104*a*. The bypass route data 320*b* allow the controller to generate a bypass route going from the start of the traversal route for the traversal region 104*a* across the lawn area 102*b* to the start of the traversal route for the traversal region 104*b*.

During mowing of a particular lawn area, the robot lawnmower can follow a predetermined path or pattern to complete cutting of the grass in the lawn area. The information about the path is stored as lawn route data. The robot lawnmower can store separate route data for each of the different lawn areas allowing each to be mowed according to a pattern that is appropriate for the lawn area. The lawn route data 325 includes lawn route data 325*a* for lawn area 102*a*, lawn route data 325*b* for lawn area 102*b*, and lawn route data 325*c* for lawn area 102*c*. The controller uses the lawn route data 325*a-c* to guide the robot through movement patterns (described in more detail below in relation to FIG. 7) that cover the areas of the lawn area 102*a-c*. The covered area of the robot is defined by the product of the mowing width $W_M$ (described above) and the length of distance traveled by the robot while executing a lawn route. The lawn route data 325*a-c* each include a start point and an end point as well as the movement pattern for each lawn area 102*a-c*, respectively. The controller can further compute the area of each lawn to determine the movement pattern. During a mowing operation, the computed area allows the controller to compare the computed area of the lawn to the covered area of the lawn to determine whether the robot has achieved enough coverage of the lawn. In some implementations, sufficient coverage is defined by a ratio of covered area to computed area greater than 1.

The path behavior data 330 indicates the operations of the robot systems (e.g. the drive system, the cutting system, the navigation system) along segments of the routes defined by the route data 315, 320, 325. For example, parts of or all of the routes corresponding to the lawn route data 325 can be associated with path behavior data 330 that instructs the controller to set the power system such that the drive system and the cutting system are both on and the grass is cut while the robot traverses the route. Parts of or all of the routes corresponding to the traversal route data 315 and the bypass data 320 can be associated with path behavior data 330 that sets the drive system to a predetermined drive speed (e.g., slower than mowing when the robot is likely to maneuver difficult turns or faster than during the mowing if the robot traverses a long distance) and the cutting system to an activation level of 0% (e.g., mowing is disabled). The path behavior data 330 can further include instructions to the navigation and/or drive systems to navigate the robot through turning and forward drive.

The scheduling data 335 can be set by the user via the mobile application or a user interface on the robot. The user can set a schedule that automates the robot to mow each lawn at a different time. For example, the robot can be set to mow lawn areas 102*a-b* at a user-selected time on one day of the week and can be set to mow lawn area 102*c* at another user-selected time on another day of the week. The scheduling data 335 determines which routes 315, 320, 325 to combine to generate a path for the mowing operation at the given time.

Figure 4A:
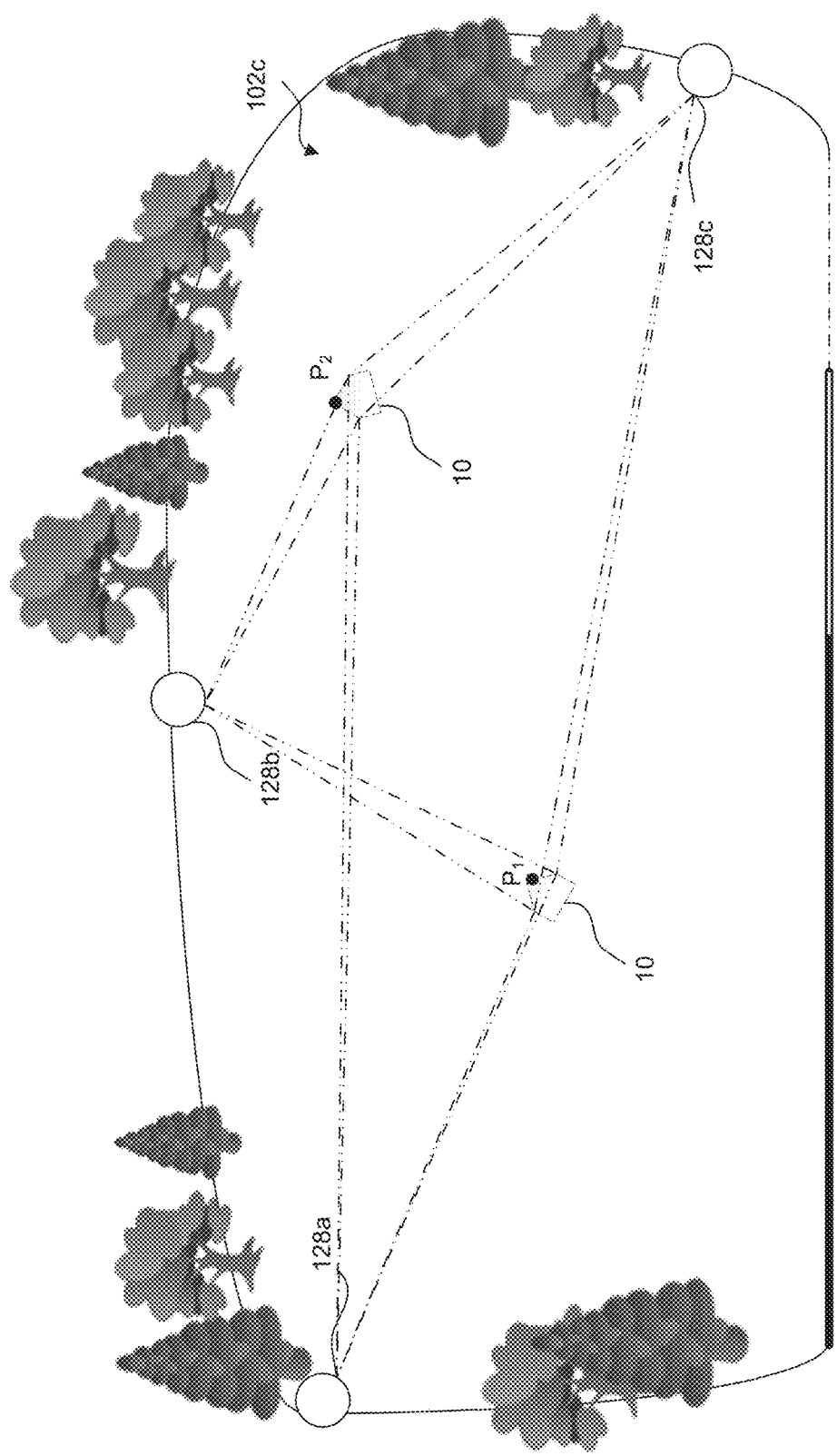
FIGS. 4A-B are schematics illustrating methods of teaching boundaries of the discontiguous lawn areas to the robot.
Figure 4B:
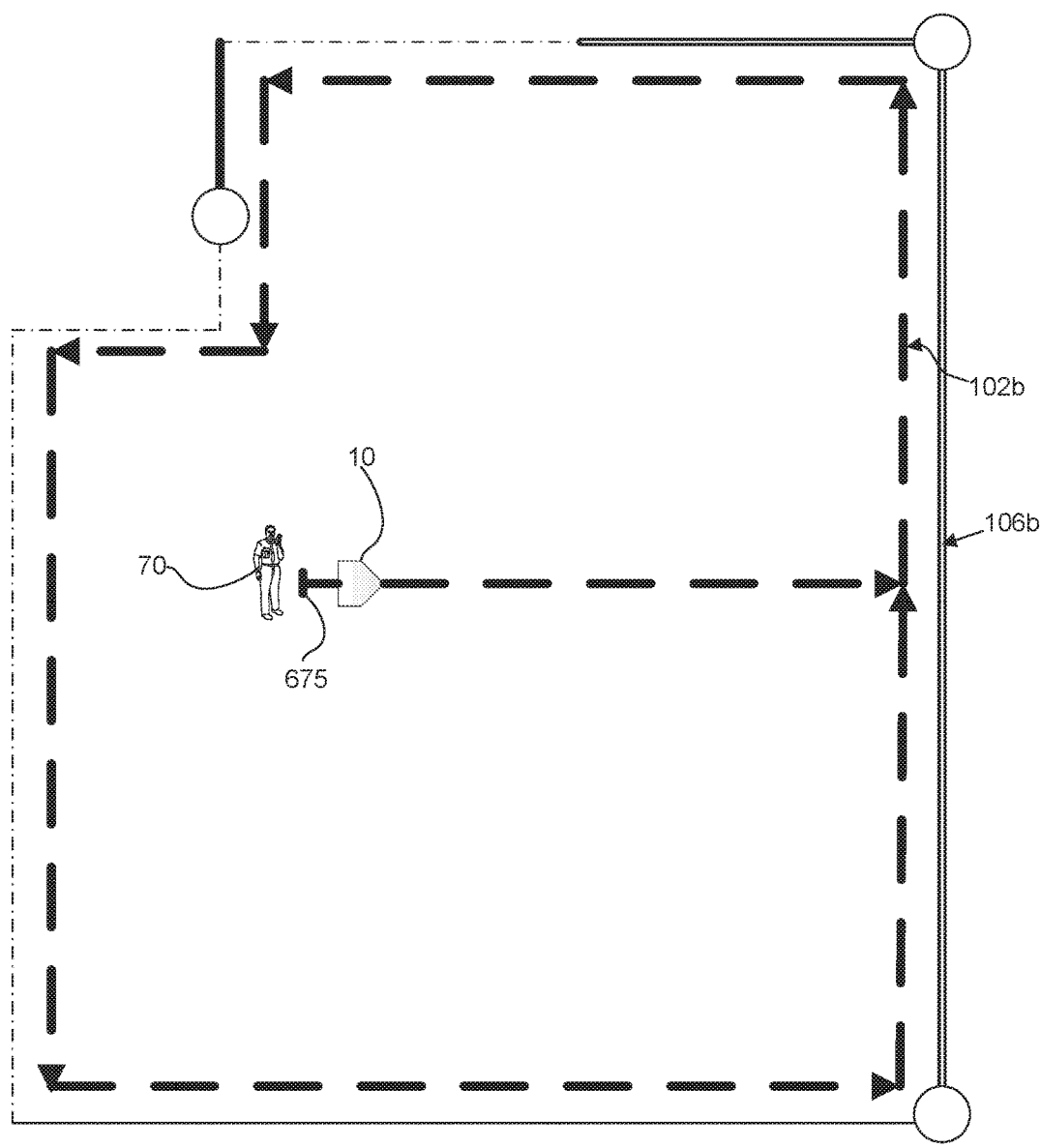
Figure 5B:
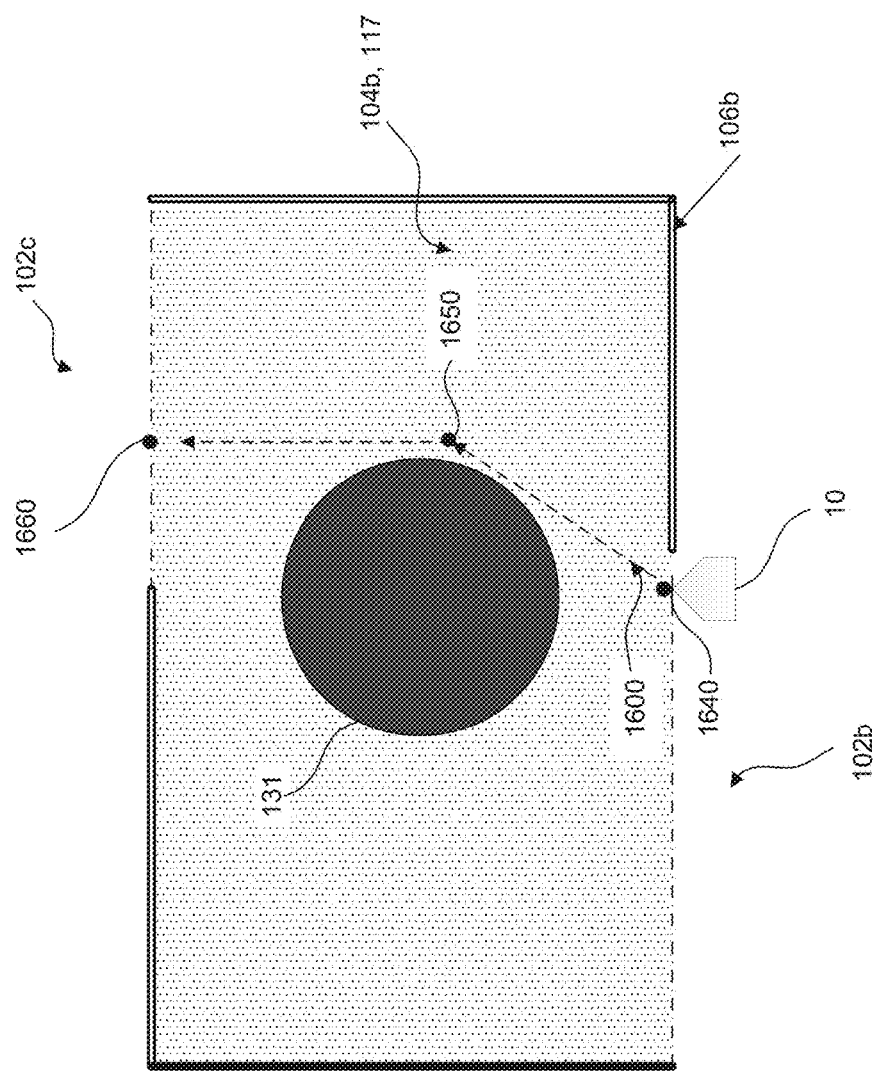
Figure 6:
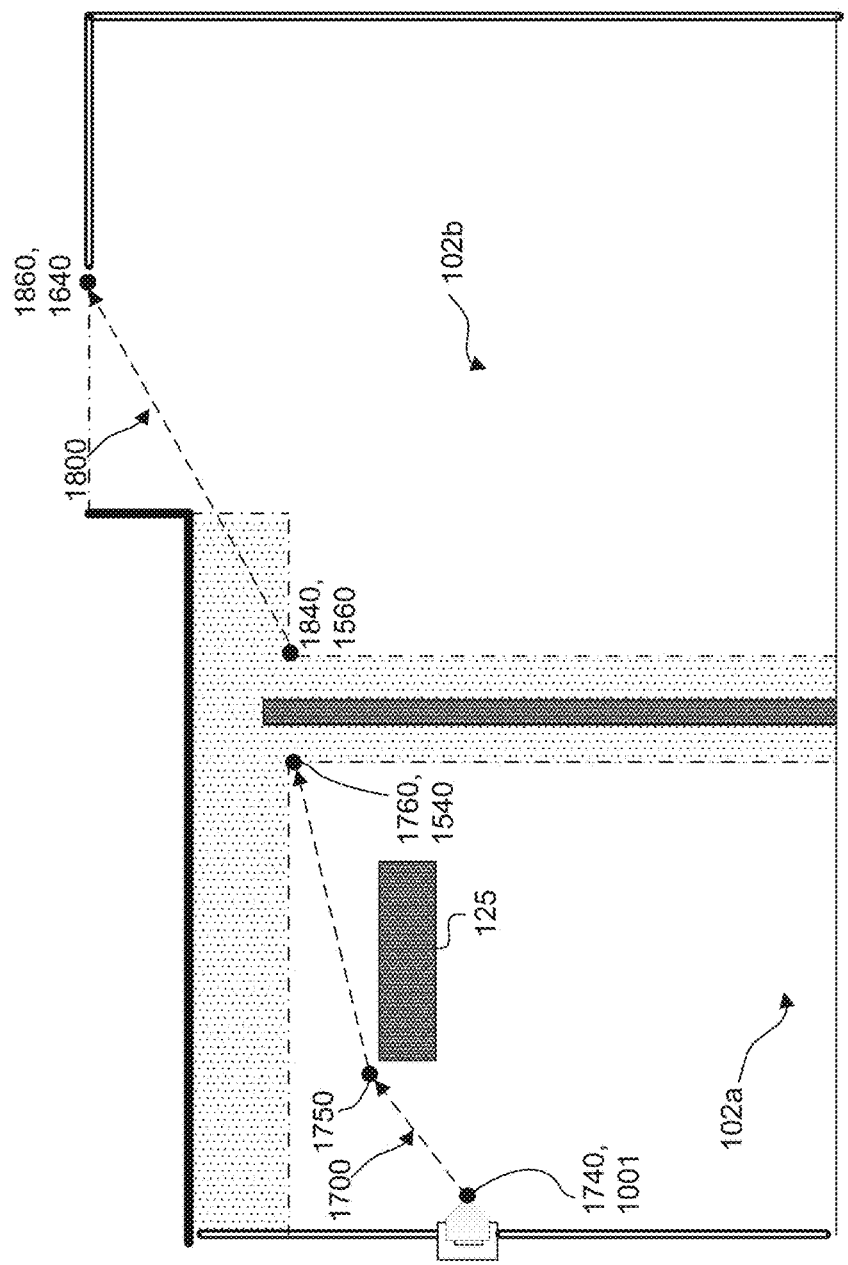
FIG. 6 is a schematic illustrating methods of teaching bypass routes of the discontiguous lawn areas to the robot.

To generate the route data 315, 320, 325, the robot can be trained manually by a user or automatically. FIGS. 4-8 depict aspects of both automated and manual methods of training the robot. In particular, FIGS. 4A-C show different examples of generating the boundary data 305 that can be used by the controller or the user to generate the route data 315, 320, 325. FIGS. 5A-C show different examples of generating the traversal route data 315. FIG. 6 depicts an example of generating the bypass route data 320. FIG. 7 shows examples of route data (e.g., lawn route data, traversal route data, and bypass route data) that can be generated based on the results from FIGS. 4-6. As the route data 315, 320, 325 are generated, the path behavior data 330 can be automatically (described in association with FIG. 7) or manually (described in association with FIG. 8) associated with each of the route data 315, 320, 325 such that appropriate systems of the robot 10 are activated and deactivated. While the examples shown in each of FIGS. 6-8 are for the lawn areas and the traversal regions of the shown geometry, it should be understood that each training mode can be implemented to train the robot 10 for a variety of lawn geometries and configurations.

FIG. 4A shows an exemplary lawn area 102*c* in which the robot 10 determines its pose within the lawn area 102*c* by detecting boundary markers 128*a-c*. Each boundary marker is positioned at a known location and situated so that the robot can detect each boundary marker as the robot navigates the lawn. To determine its position on the lawn, the robot receives signals from the individual boundary markers. The robot determines its pose based on the signals, which can represent the robot's location relative to the three boundary markers.

The pose of the robot (e.g., $P_1$, $P_2$) can be determined based on the signals received from the boundary markers (e.g., a signal sent from the robot and reflected by the boundary marker or a signal generated by the boundary marker and received by the robot). The robot lawnmower determines the distance between the robot and the boundary marker based on the time-of-flight between the marker and the robot. Thus, based on the information from multiple boundary markers, the robot's pose can be determined by trilaterating based on received range/heading information from each of the boundary markers. In general, trilateration is the process of determining absolute or relative locations of points by measuring distances, using the geometry of circles, spheres, or triangles. In one example, trilateration can be based on a least squares algorithm using the distance/time-of-flight measurements. In another example, time-of-flight can be measured indirectly by measuring the phase shift between the signal and the receipt of the reflect signal.

Alternately, distance can be determined by transmitting a signal from the robot, measuring the time the signal arrives at each boundary marker, and using a time-difference-of-arrival technique to estimate the robot's location.

The boundary 106b is trained using a teach-and-playback routing in which the user pushes the robot around the boundary 106b and the robot stores information about the location of the trained boundary. Further details of an exemplary process for determining the lawn boundary can be found, for example, in U.S. Ser. No. 14/512,098 filed on Oct. 10, 2014 and titled "Robotic Lawn Mowing Boundary Determination," the contents of which is hereby incorporated by reference in its entirety.

FIG. 4B shows a manual process of generating the lawn boundary data for the lawn area 102b. The user manually navigates the robot 10 around the boundary 106b of the lawn area 102b by guiding the robot 10 with the detachable handle 675, and the robot 10 generates the boundary data 305b as it is moved around the lawn area 102b. The user 70 manually maneuvers the robot 10 by pushing and pulling the handle 675. The robot 10 can automatically store points, or the user 70 can manually trigger a point to be stored. As the user 70 moves the robot 10, the robot 10 can be programmed to store the point corresponding to its current position route under the boundary data 305b (described in reference to FIG. 3 above) for the boundary 106b of the lawn area 102b. In some implementations, the robot 10 can be programmed to automatically store its current position every second. The user 70 can also manually instruct the robot 10 to store its current position, via, for example, the application on the mobile device, which will be described in more detail later.

In some examples, a data processing unit generates a 2D grid of cells to represent the lawn areas. As the robot lawnmower determines its position relative to the beacons, the data processing unit determines and saves the coordinates of each cell containing the robot lawnmower during its motion. For each lawn area, each cell in the grid can be assigned a mowing-area value indicating whether the cell is understood to be NONMOWABLE (i.e. outside the boundary), MOWABLE (i.e., inside the boundary), or BOUNDARY (i.e., on the boundary). Each cell of the grid can be assigned (X, Y) coordinates based on a chosen origin (0,0) cell. Each cell can represent a square area, with each cell having a side length between 1 and 100 cm. For example, the grid can be a grid of cells, each 10 cm×10 cm. The robot lawnmower stores the (X, Y) coordinates of each cell traversed by the robot lawnmower along the actual teaching path travelled during the teaching mode. The robot lawnmower can mark the actual teaching path as a simple line tracing the path of the robot through single cells. Alternatively, the robot can mark all cells under the footprint of the robot as BOUNDARY cells. At the start of teaching, the values of all cells are initialized to NONMOWABLE. The operator presses the start button to start the training process and then drives around the boundary of the mowing area. As the robot drives, the values of all cells along its actual teaching path are set to BOUNDARY, the location of the cells being determined by the distance to the beacons. After walking the boundary, the operator presses a button to end the teaching process. Then, the operator positions the robot lawnmower anywhere within the mowing area and presses a button, indicating to the robot lawnmower that it is inside the boundary. In response, the system performs a flood fill to set the values of all cells inside boundary defined by the BOUNDARY cells to mark them as MOWABLE cells to be mowed.

Referring back to FIG. 3, the traversal route data 315 instructs the robot with a route to move across the traversal regions between the separated lawn areas, such as the traversal regions 104a-b shown in FIG. 2. By way of general overview, to train the traversal route data, the controller determines and stores at least a traversal launch point and a traversal landing point. In some implementations, the controller further determines and stores intermediate traversal points. FIGS. 5A and 5B depict examples of points generated for the traversal route data 315a and 315b (described earlier in relation to FIG. 3), respectively. The traversal route data 315a contain points that define a traversal route 1500 within the traversal region 104a that the robot takes to move from the lawn area 102a to the lawn area 102b. The traversal route data 315b contain points that define a traversal route 1600 within the traversal region 104b that the robot follows to move from the lawn area 102b to the lawn area 102c.

FIGS. 5A-B show examples of the traversal routes 1500, 1600, respectively, generated for the traversal regions 104a-b, respectively. During the traversal operation, the robot 10 navigates across the traversal regions 104a-b by going sequentially through points that define the traversal routes 1500, 1600. The traversal route 1500 is defined by a first traversal launch point 1540, intermediate traversal points 1550a-b, and a first traversal landing point 1560. The robot 10 moves sequentially in straight line segments from point 1540, to point 1550a, to point 1550b, to point 1560. Referring to FIG. 5B, the traversal route 1600 is defined by a second traversal launch point 1640, an intermediate traversal point 1650, and a second traversal landing point 1660. To move across the traversal region 104b, the robot 10 moves sequentially in straight line segments from point 1640, to point 1650, to point 1660. While the example shown in FIG. 5C shows the traversal route data for particular configurations of the traversal regions, it should be understood that traversal route data can be generated for other traversable configurations of traversal regions.

In some examples, the route between the traversal launch point and the traversal landing point can be trained using a process similar to the process used to train the boundary of the lawn. For example, the user can place the robot into a traversal training mode and the traversal launch point can be the robot's location relative to the beacons. The user then pushes the robot along a path and the robot stores the path in a memory. The end of the path is stored as the traversal landing point.

While in the example described above, the traversal route was manually trained, in some examples an automated process can be used to train the traversal route. In an automated implementation of training the traversal route 1500, the controller automatically generates the traversal route 1500. Referring to FIG. 5A, the controller determines and stores the shortest traversable route between a source boundary (the boundary 106a) and a destination boundary (the boundary 106b). The robot 10 can identify the shortest traversable route in various ways. For example, the robot can identify locations where the robot is able to drive between one area and the other (e.g., determine regions free of obstacles). Given a grid-based representation of the lawn as described earlier, a path planning algorithm such as A*, rapidly exploring random trees (RRTs), or probabilistic roadmaps can then be used to find the shortest path from the robot's current location to the destination.

In a manual implementation of training the traversal routes 1500, 1600, the robot 10 is manually driven via a detachable handle (described earlier in relation to FIG. 4C but not shown in FIG. 5). When the user attaches the detachable handle to the robot 10 and notes in the application that the user is performing a traversal route training, the controller initiates a training mode. With respect to the traversal route 1500, the user navigates the robot 10 through the traversal route 1500, and the robot systems (e.g. the controller and the memory storage elements) generate points corresponding to the traversal route 1500. The robot systems, via the manual navigation of the robot 10, can generate points substantially similar to the ones described above, e.g., the traversal launch point 1540, the traversal landing point 1560, and the intermediate traversal points 1550*a-b*, though it should be understood that the user can navigate the robot 10 along a different route with fewer or more intermediate traversal points. When the users pushes the robot 10 out of the region of the lawn area 102*a*, the controller of the robot 10 confirms this departure and generates the traversal launch point 1540 corresponding to the point where the robot 10 exits the lawn area 102*a*. The user of the robot 10 guides the robot through the traversal route 1500 turning to avoid the floral divider 116 and the robot 10 stores information about the path the robot 10 follows during the traversal route training. When the user pushes the robot 10 across the boundary 106*b*, the controller can detect the crossing based on mapping data of the lawn 104*b* and automatically generate the traversal landing point 1560.

With respect to the traversal route 1600, the user pushes the robot 10 across the boundary 106*b* in a diagonal direction, and the controller generates the traversal launch point 1640. The user manually navigates the robot 10 toward the boundary 106*c* avoiding the fire pit 131 and the robot 10 stores the path followed by the robot 10. When the robot 10 crosses the boundary 106*c*, the controller generates the traversal landing point 1660 and completes the traversal route training for the traversal region 104*b*.

In some examples, as noted above, the data processing unit generates a 2D grid of cells to represent the lawn areas and each cell is indicated as MOWABLE, NONMOWABLE, or BOUNDARY. In such a grid based system, during training of the traversal region, as the robot lawnmower determines its position relative to the beacons, the data processing unit determines and saves the coordinates of each cell containing the robot lawnmower during its motion (e.g., while traversing the boundary area between the lawn areas). Each cell of the grid can be assigned (X, Y) coordinates based on a chosen origin (0,0) cell. The robot lawnmower stores the (X, Y) coordinates of each cell traversed by the robot lawnmower along the actual teaching path travelled during the teaching of the traversal path. The robot lawnmower can mark the actual teaching path as a simple line tracing the path of the robot through single cells. Alternatively, the robot can mark all cells under the footprint of the robot as TRAVERSAL PATH cells.

At the start of teaching, the values of all cells between the multiple mowing lawn areas are initialized to NONMOWABLE. The operator presses the start button to start the teach process and then drives from one lawn area to another lawn area. As the robot drives, the values of all cells along its actual teaching path are set to TRAVERSAL PATH, the location of the cells being determined by the distance to the beacons. After walking the traversal path, the operator presses a button to end the teaching process. During operation, when the robot lawnmower traverses calls marked as TRAVERSAL PATH, the robot lawnmower disables (turns off) its cutting system.

FIG. 6 is an example of training bypass route data 320*a*, 320*b*, which provides data the controller uses to cross through the lawn area 102*a*, 102*b*, respectively. The controller generates a bypass launch point 1740 corresponding to the launch point 1001. The controller further generates a bypass landing point 1760, which coincides with the traversal launch point 1540. The bypass launch and landing points are locations relative to the beacons. The controller determines and stores the shortest route between the bypass launch point 1740 and the bypass landing point 1760 avoiding any keep-out zones within the lawn area. The controller selects initial points for the shortest route. The controller directs the robot 10 to move from the bypass launch point 1740 to the bypass landing point 1760 via the shortest route (e.g., a straight line). The controller knows the location of the rose garden 125 from the keep-out zone training of the mowable space and uses internal boundary data (e.g., internal boundary data 310 depicted in FIG. 3) for the rose garden 125 to determine a bypass route 1700 that avoids traversal of the prohibited space. As a result of this route determination, the controller stores the bypass launch point 1740, an intermediate bypass point 1750, and the bypass landing point 1760 as shown in FIG. 6.

Similarly, to train the bypass route data 320*b* representing the bypass route 1800, the controller generates a bypass launch point 1840 that coincides with the traversal landing point 1560 and a bypass landing point 1860 that coincides with the traversal launch point 1640. The controller determines and stores the shortest route between the bypass launch point 1840 and the bypass landing point 1860 that avoids prohibited or keep-out areas (e.g., determines a path that stays within the mowable space). In other examples, a user can train the bypass routes in a similar manner to the process used to train the boundary by pushing the mower along a desired path while the robot stores information about the path.

In some examples, as noted above, the data processing unit generates a 2D grid of cells to represent the lawn areas, and each cell is indicated as MOWABLE, NONMOWABLE, or BOUNDARY. Regions between the lawn areas can have connection paths marked as TRAVERSAL PATH cells. In such a grid based system, during training of the bypass route, as the robot lawnmower determines its position relative to the beacons, the data processing unit determines and saves the coordinates of each cell containing the robot lawnmower during its motion (e.g., while traversing across the lawn area). Each cell of the grid can be assigned (X, Y) coordinates based on a chosen origin (0,0) cell. The robot lawnmower stores the (X, Y) coordinates of each cell traversed by the robot lawnmower along the actual teaching path travelled during the teaching of the bypass path. The robot lawnmower can mark the actual teaching path as a simple line tracing the path of the robot through single cells. Alternatively, the robot can mark all cells under the footprint of the robot as BYPASS cells.

At the start of teaching, since the bypass route is within the lawn area to be mowed, the values of all cells are MOWABLE. The operator presses the start button to start the teach process and then drives from one position within the lawn area to another position within the lawn area. As the robot drives, the values of all cells along its actual teaching path are set to BYPASS (or MOWABLE/BYPASS), the location of the cells being determined by the distance to the beacons. After walking the bypass route path, the operator presses a button to end the teaching process.

Figure 7A:
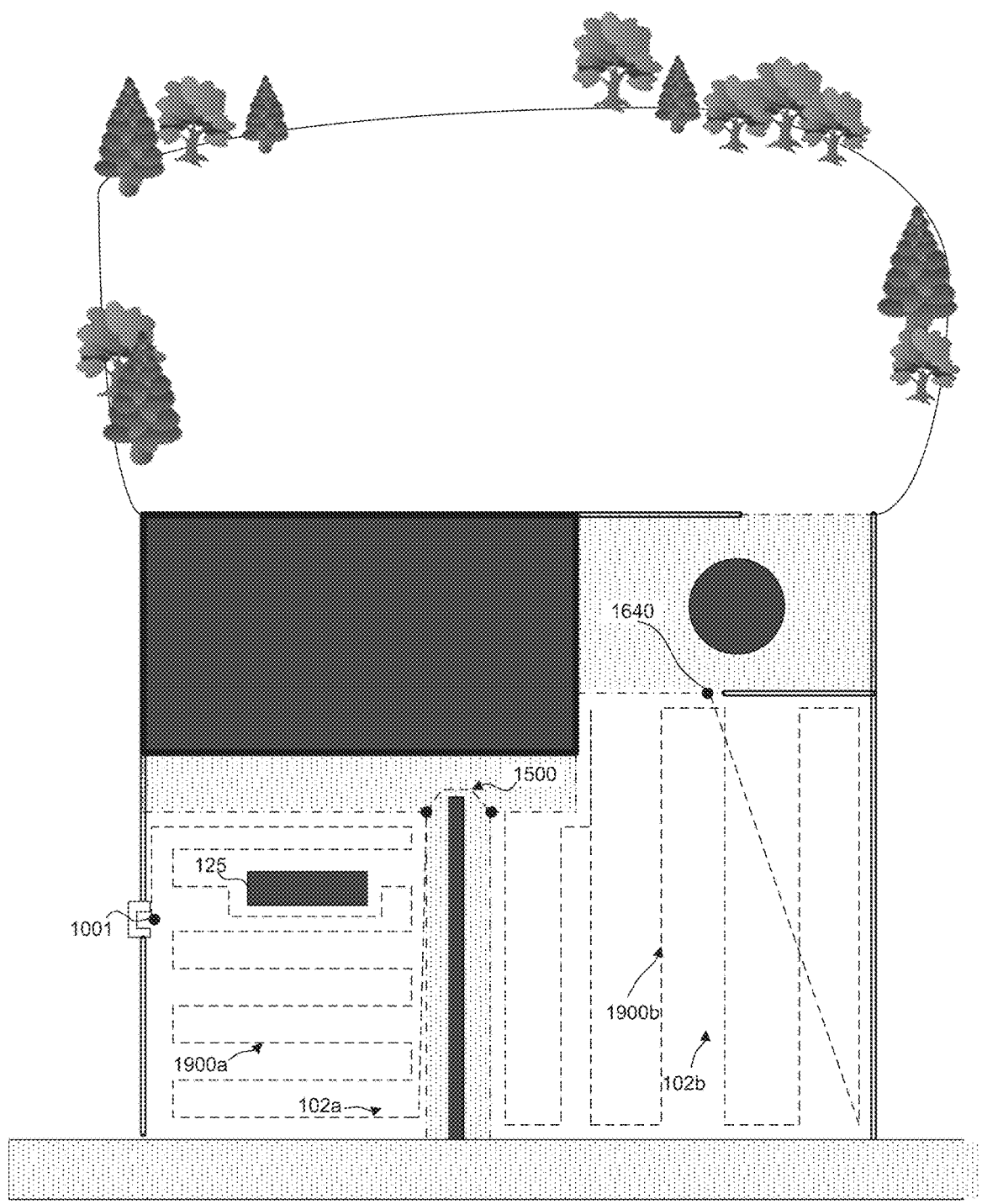
FIGS. 7A-B are the schematic of FIG. 2, each with a different overlaid route for the robot.
Figure 7B:
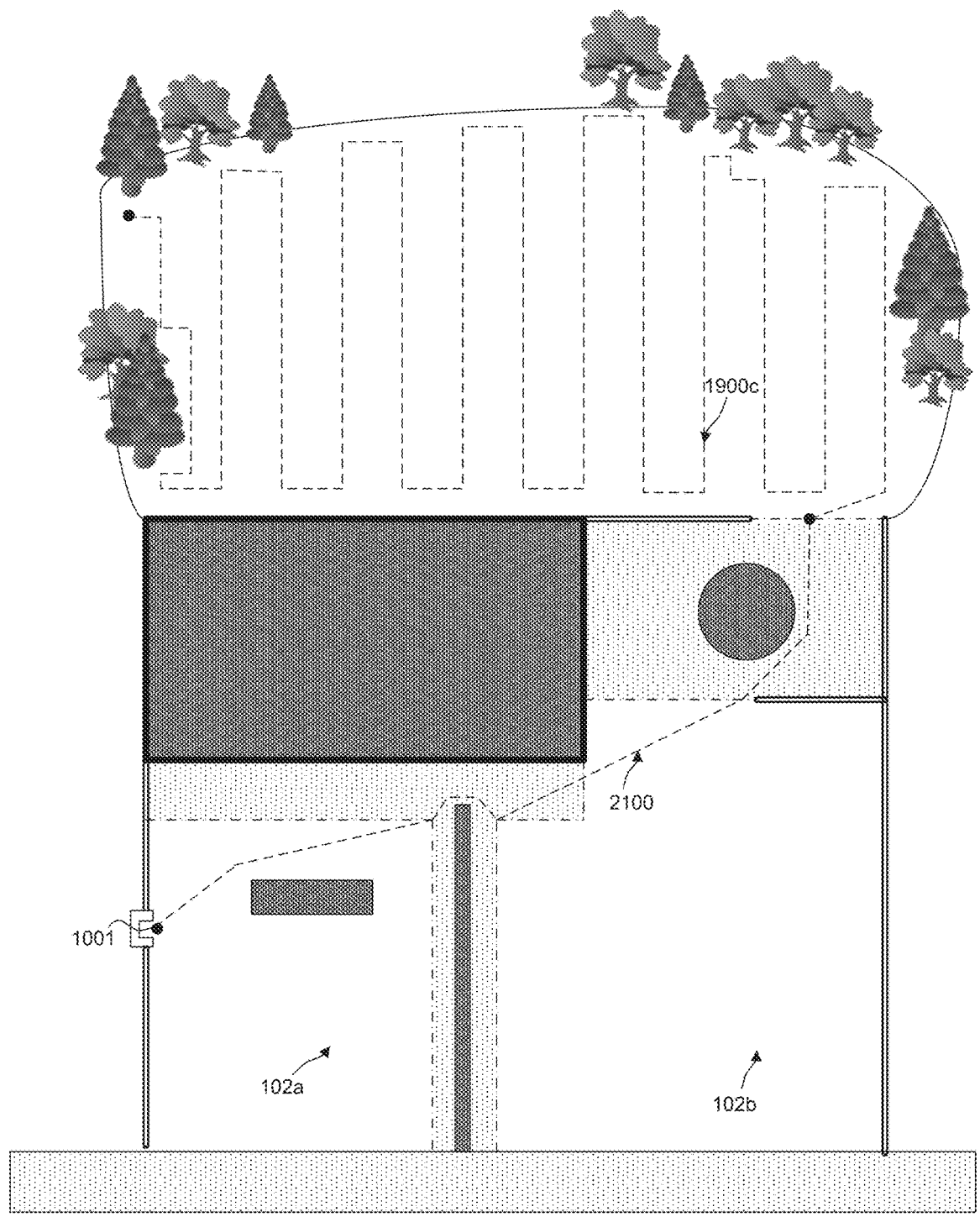
Figure 8:
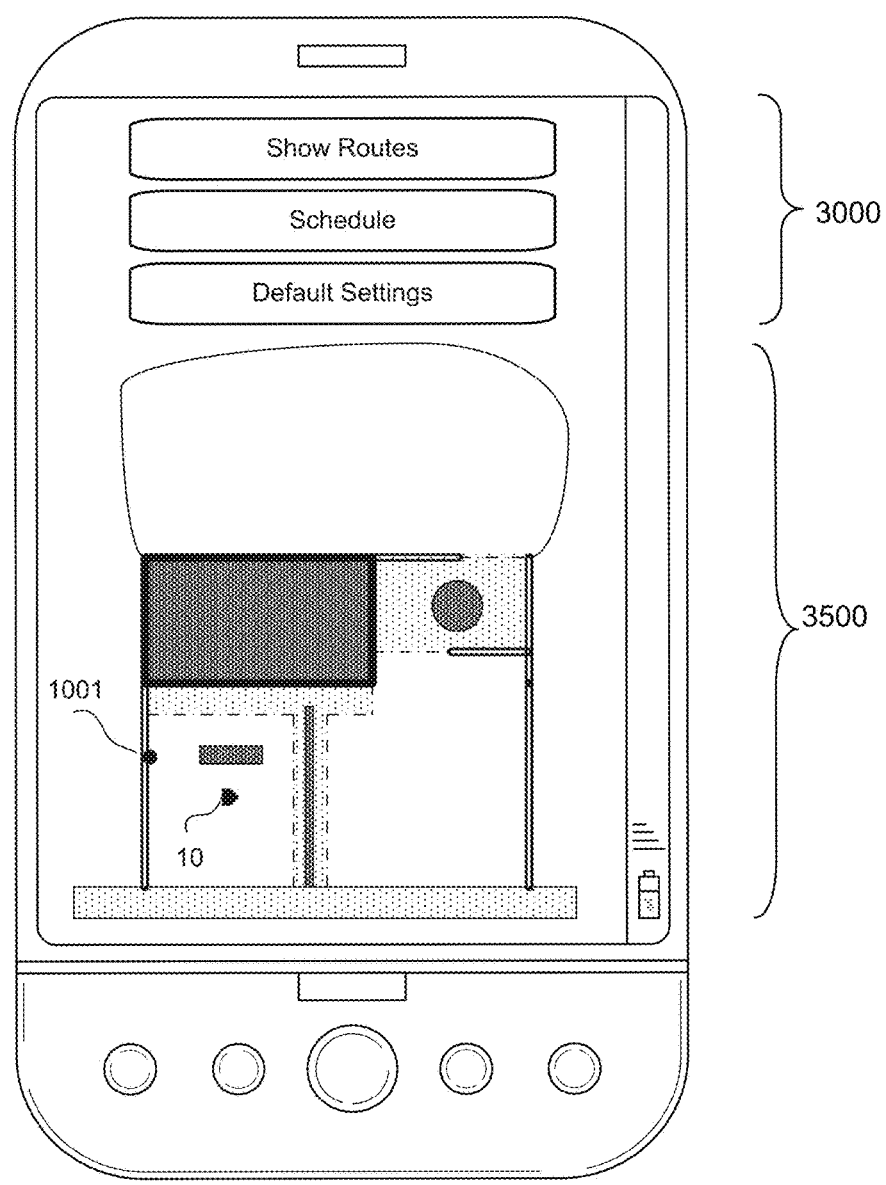
FIG. 8 is a screenshot of a computing device installed with an application to control the robot.

FIGS. 7A-B depict automatic generation of the lawn route data 325*a-c* as well as the different path behaviors 330 associated with the route data 315, 320 generated above. The lawn route data 325*a-c* includes a start point, an end point, and a movement pattern. The movement pattern can be, for example, a spiral pattern, a corn row pattern, zig-zag pattern, etc. A user can select a desired movement pattern for each of the lawn areas and different patterns may be selected for different areas of the same lawn.

In some examples, a yard may be too large to mow on a single charge of the robot lawnmower battery. In such situations, the robot can mow different areas of the yard at different times allowing the robot to return to the dock and charge its battery between mowing the different areas.

FIG. 7A depicts the execution of a mowing operation of lawn area 102a, 102b, after which the robot returns to the charging dock 50. FIG. 7B depicts the execution of a mowing operation of lawn area 102c after which the robot returns to the charging dock 50. In the examples as shown, the lawn routes 1900a-b are automatically generated based on the start points, the end points, and default movement patterns. For the lawn area 102a, the robot is beginning at the launch point 1001 and proceeds in a corn row movement pattern until the robot has determined that it has covered the lawn area 102a (e.g., completed the coverage pattern or determined that the covered area—defined by, for example, the distance covered by the robot multiplied by the width of the cutting element—is greater than 100% of the computed area for the lawn area 102a). The corn row movement pattern guides the robot back and forth across the lawn such that the robot moves perpendicular to the longitudinal movement of the pattern slightly between each traversal. Upon completion of mowing of lawn area 102a, to move from the lawn area 102a to the lawn area 102b, the controller executes the traversal route data 320a which defines the traversal route 1500. The associated path behavior data 330 for the traversal route data 320 includes a deactivation of the cutting system. For the lawn route data 325b, the start point is defined as the traversal landing point 1560, and the end point is defined as the traversal launch point 1640. Upon entry into lawn area 102b, the robot activates the cutting system. After completion, the robot returns to the launch point 1001.

Referring to FIG. 7B, at a subsequent time (e.g., after charging) the robot continues to mow the lawn by mowing lawn area 102c. To move from the launch point 1001 to the lawn area 102c, the controller executes the bypass route data 320a, the traversal route data 315a, the bypass route data 320b, and the traversal route data 315b. The data 320a-b, 315a-b together define a bypass route 2100 to move the robot from the launch point 1001 to lawn area 102c. The associated path behavior data 330 for the bypass route 2100 to bypass the lawn areas 102a-b includes a deactivation of the cutting system. Upon entry into the intended area to mow, the robot activates the cutting system. The start point of the lawn route 1900c corresponds to the end point of the bypass route 2100. The robot proceeds in a corn row movement pattern until the robot has determined that it has covered the lawn area 102c. When the robot has determined that the robot has covered the lawn area 102c, the controller directs the robot 10 to return to the launch point 1001.

As mentioned throughout this disclosure, the user can monitor and control various aspects of the robot and the training of the robot through an application installed on a computing device, which allows a user to enable functionality such as scheduling, bypassing, movement selection, lawn area selection, among other functions. The user can interact with the computing device via user interface features, such as a touchscreen display, a keyboard, voice command, gestures, or another type of interaction. While the computing device as shown in FIG. 8 is a smartphone, in other implementations, the device could be a portable device such as smart glasses, smart watch, a laptop computer, or a computing device such as a desktop computer.

FIG. 8 shows a screenshot of the user interface of the exemplary lawn area shown in FIG. 2. The mobile device displays a menu portion 3000 and a map portion 3500. The menu portion 3000 shows options including "Show Routes", "Schedule", and "Default Settings". Tapping "Show Routes" on the menu portion 3000 will reveal the points or cells stored as a result of training the traversal routes, bypass routes, and lawn routes. As will be discussed, the user can interact with these points. Tapping "Schedule" allows the user to modify the schedule for the mowing operations of the robot. Tapping "Default Settings" allows the user to modify the default settings for the training subroutines.

The map portion 3500 includes a satellite map of the lawn areas that the user would like to mow. The satellite map can be selected by the user and can be downloaded from a map provider service. The processor of the mobile device can further recognize boundaries and delineations on the satellite map. Prior to any training, the user can interact with the satellite map to give a general area corresponding to the lawn areas that the user wishes to mow. The user can use the touchscreen to draw geometric shapes that function as virtual regions that can assist the robot in training. A user can set a virtual region as a lawn area, which can give the controller a general location for the boundary of the lawn areas. The user can further set virtual regions for the traversal regions and for obstacles. Also prior to training, the map includes the launch point 1001 corresponding to the location of the charging dock as well as the current location of the robot 10. The user can also select default settings for the training methods described herein.

As the user proceeds through additional aspects of training the robot (e.g. boundary training, traversal route training, and bypass route training), additional options from the main menu become available. After the robot has completed boundary training of the lawn areas, the map can include the points of the boundary data 305 (described above). While the traversal launch point and traversal landing point for each traversal region have been described as set automatically, the user can also override the automatically selected points by selecting one of the points of the boundaries shown on the map on the application. After the user selects traversal launch points and traversal landing points for each traversal region, the controller can further implement optimization algorithms (e.g. quasi-Newton methods) that consider the location of the traversal launch points and traversal landing points to compute the shortest route between the traversal launch points and the traversal landing points. In some implementations, the user can mark on the mobile device the boundaries that are traversable and non-traversable.

After a traversal launch point and a traversal end point for a traversal region are determined and stored, the user can initiate the automated or manual traversal route training described in detail earlier. As the mowing pattern can be defined after a lawn route start point and a lawn route end point have been defined, the user can also select the mowing pattern of each lawn prior to implementing the traversal route training.

The user can further create a schedule for the robot. Each area of the lawn can be separately scheduled. Thus, the robot stores scheduling data for each of multiple lawn areas. For example, if the user would like the robot to mow lawn area 102c separately from lawn areas 102a-b, the user can select the lawn area 102c via the user interface and set a schedule (e.g. time and day of week) to mow the lawn area 102c. The robot can be scheduled to mow the lawn areas 102a-b in one mowing operation and the lawn area 102c in another mowing operation. When the robot is scheduled to mow lawn area 102b, the robot will follow the routes as described in FIG. 7A. When the robot is scheduled to mow lawn area 102c, the robot will bypass the lawn areas 102a-b to mow the lawn area 102c, as shown in FIG. 7B.

FIG. 9 is a flow chart for training a robot to mow a first and a second lawn with a traversal region that separates the first lawn from the second lawn, such as lawn areas 102a-b of FIG. 2. In general, the process involves identifying the boundary of the first lawn, identifying the boundary of the second lawn, selecting a traversal launch point, train first lawn route, selecting intermediate traversal points, selecting a traversal landing point, training a bypass route for the first lawn, selecting a movement pattern for the first lawn, and selecting a movement pattern for the second lawn area.

At step S900 the controller trains the robot to identify the boundary of the first lawn area. The controller implements one or more of the boundary training methods described with respect to FIGS. 4A-C to generate the points corresponding to the boundary of the first lawn area.

At step S905, the controller trains the robot to identify the boundary of the second lawn area. The controller implements one or more of the boundary training methods described with respect to FIGS. 4A-C to generate the points corresponding to the boundary of the second lawn area.

At step S910, the controller trains the traversal launch point. The controller can train the traversal launch point via a user selection on the application as described in FIG. 8, or the controller can implement route training (e.g., as described in FIG. 5) to automatically select the traversal launch point.

At step S915, the controller trains a first lawn route for the first lawn area. The first lawn area route uses a start point generally pre-determined by the location of a charging station and uses an end point determined by the traversal launch point trained in step S910. The controller selects a first mowing pattern for the first lawn route that can be a default pattern (e.g. corn row pattern) for the geometry of the first lawn area. The controller can further set the associated path behavior for the first lawn route.

At step S920, the controller trains the intermediate traversal points and the traversal landing point for the traversal region by implementing the traversal route training as described with respect FIG. 5A-B. The controller navigates the robot to the traversal launch point selected in step S910 and directs the robot through the traversal region as the controller implements the traversal route training. If there are obstacles within the traversal region, the controller can generate intermediate traversal points as the robot avoids the obstacles. As the robot crosses the traversal region and enters the second lawn, the controller generates the traversal landing point and thus completes the training of the traversal route. The controller can further set the associated path behavior for the traversal route including turning off the cutting system of the robot lawnmower.

At step S925, the controller trains a second lawn route for the second lawn area. The mowing pattern for the second lawn uses a start point generally determined by the location of the traversal landing point training in step S920. The mowing pattern for the second lawn uses an end point generally determined by the boundary points trained in step S905 and the traversal landing point. In some implementations, the end point is the boundary point farthest from the traversal landing point. The controller selects a second mowing pattern for the second lawn route that can be a default pattern (e.g. corn row pattern) for the geometry of the first lawn area. The controller can further set the associated path behavior for the second lawn route.

At step S930, the controller trains the bypass route to move from a launch point corresponding to the location of the charging station across the first lawn area to the start of the traversal route. The controller implements bypass route training described in FIG. 7 to generate the points of the bypass route. The controller can further set the associated path behavior for the bypass route.

FIG. 10A-B are flow charts for the mowing operations after the robot has been trained following the method of FIG. 9.

FIG. 10A is a flow chart of a mowing operation that mows both the first lawn area and the second lawn area. At step S1000A, the robot enables a cutting system of the robot and mows the first lawn area. The robot follows the first mowing pattern determined in step S915. After the robot has covered an area of at least 100% of the area of the first lawn, the mowing pattern ends at the traversal launch point determined in step S910.

At step S1005A, after the robot reaches the traversal launch point of the traversal route, the robot disables the cutting system and begins traversing the traversal region via the traversal route (including the traversal start point, the intermediate traversal points, and the traversal end point) determined in steps S910 and S920. The robot completes the traversal route at the traversal end point determined in step S920.

At step S1010A, after the robot traverses the traversal region, the robot enables the cutting system and begins to mow the second lawn via the second lawn route determined in step S925. The robot follows the second mowing pattern until the robot has covered an area at least 100% of the area of the second lawn area. The robot then terminates the second lawn route at the end point determined in step S925.

At step S1015A, after the robot reaches the end point of the second lawn route, the robot disables the cutting system and returns to the launch point.

FIG. 10B is a flow chart of a mowing operation that bypasses the first lawn and mows the second lawn area. At step S1000B, the robot disables a mowing function, bypasses the first lawn via the bypass route trained in step S935, traverses the first traversal region via the traversal route trained in steps S910 and S920 to reach the traversal landing point on the second lawn area.

At step S1005B, after the robot reaches the traversal landing point of the traversal route, the robot enables the cutting system and begins to mow the second lawn via the second lawn route determined in step S925. The robot follows the second mowing pattern until the robot has covered an area at least 100% of the area of the second lawn area. The robot then terminates the second lawn route at the end point determined in step S925.

At step S1010B, after the robot reaches the end point of the second lawn route, the robot disables the cutting system and returns to the launch point.

While the examples as described in this disclosure described three discontiguous lawn areas 102a-c, in some implementations, the robot can be trained to mow more or fewer lawn areas. For example, in some implementations, the robot can be trained to mow a continuous lawn and consequently does not require traversal route data to move across traversal regions. In other implementations, the robot can be trained to mow several discontiguous lawn areas (e.g. four or more). The robot can be scheduled to execute several mowing operations at different times so that the power system of the robot can be sustained through the entire mowing operation. The robot can be trained to include several bypass routes that allow the robot to bypass lawn areas that are not to be mowed in a mowing operation.

While the combination of activation levels of systems have been briefly described (e.g. a 50% activation level of the drive system and 0% activation level of the cutting system during the traversal operations) for various operations, in some implementations, the setting of the activation levels can be adaptive. For example, as the robot executes training operations, the robot may have swath sensors that can detect the stiffness of grass that the robot passes over. As the robot detects the stiffness of the grass, it can modify the activation level of the cutting system during mowing operations to accommodate the stiffness. If the grass is stiff, then the activation level of the cutting system can be increased. The robot can further include torque or force sensors in the drive system to determine the level of activation for the drive system to drive the wheel modules to cross various terrains.

While the scheduling data 335 has been described to be set by the user via application on the computing device, in some implementations, the controller can be configured to automatically set the scheduling data. The controller can, for example, compute the area of each of the discontiguous lawn areas and the distance of potential routes, and use those computations to estimate an amount of power consumption associated with particular route options. The controller can then set a schedule of routes such that the robot can execute each mowing operation with a full charge of power.

While path planning algorithms such as A*, rapidly exploring random trees (RRTs), or probabilistic roadmaps have been described to be used to train the traversal and bypass routes, in other implementations, other algorithms, such as Floyd-Warshall algorithm, Johnson's algorithm, and Dijkstra's algorithm, can be used to reduce computational load. For example, in cases where the first set of points includes only one point or the second set of points includes only one point, a single source or single destination shortest path algorithm such as Dijkstra's algorithm can be used.

While the threshold mowing area coverage has been described to be 100% of the area of the lawn, in some implementations the threshold mowing area coverage can be greater. In other implementations, the threshold mowing area coverage can be greater than, for example, 150% of the area of the lawn area 102a.

In the manual mode, while the robot has been described to detect the handle via the sensor system, in some implementations, the user can manually instruct the robot that the handle has been attached. Also in the manual mode with automatic point storage, the robot has been described to store a point every second. In other implementations, the duration of time between storing points can be modified by the user to be more or less. For example, for larger lawn areas, it can be beneficial to store fewer points in order to reduce the amount of storage space dedicated to the lawn route data.

While the handle 675 has been described as detachable, in other implementations, the handle remains on the robot but is collapsible or stowable. For example, the handle can be telescoping so that the handle can be collapsed into a small form factor when not in use.

Although virtual characteristics are not shown to define the lawn area 102a-c, in some implementations, the user can use the application on the computing device to manually define general boundaries. The manually defined boundaries on the application can generate virtual markers that the robot follows to map the boundaries.

While the cells of the 2D grid of cells to represent the lawn have been described to represent a square area with side lengths between 1 and 100 cm, in other implementations the cells can be larger or smaller depending on the property. For example, for larger properties (e.g. a football field, a golf course), the side lengths could be between 1 and 10 m. In some implementations, the user manually sets the side lengths. In other implementations, the controller selects a cell size based on an input for the area of the lawn or property. In further examples, the controller implements an adaptive algorithm that determines the cell size based on the geometry of the lawn. For example, for amorphous lawn shapes, a larger number of cells can be used to reflect the amorphous geometry.

In some implementations, the user can select objective functions for the path planning algorithm. For example, instead of requesting a route with minimum distance between the traversal launch point and the traversal landing point, the user may select an objective function that the controller minimizes to select a route with the fewest number of turns, a route that begins and ends at specific points (e.g., the user pre-defines the traversal launch point and the traversal landing point). The user can also select more than one objective function to minimize. For example, the user may want to minimize the number of turns as well as the distance between the traversal launch point and the traversal landing point.

While the training method for the traversal routes 1500, 1600 and the bypass routes 1700, 1800 have been described to include one or less obstacles in between the respective launch and landing points, in some implementations, additional obstacles are detected during training. After generating the intermediate points and attempting the traversal or bypass route generated during the training, the controller determines the presence of an additional obstacle. The controller maps the additional obstacle and generates additional intermediate points to find an optimized path to avoid the obstacle. The controller continues to iterate through the training method until the controller directs the robot through a route without detecting an additional obstacle.

While the traversal launch points and traversal landing points have been described to selected in an automated manner or via the user application installed on the mobile device, in some implementations, the boundary markers placed along the boundary can also serve as traversal launch points and traversal landing points. In such implementations, as opposed to relying on virtual markers for the traversal launch and landing points, the user can place a physical marker (e.g., the boundary markers) that represent the traversal launch points and traversal landing points.

While the example of route segments shown in this disclosure focus on straight line segments between points, it should be understood that other curve geometries, such as arcs, can be generated with points on a route. Associating a polynomial with two points on a route can, for example, generate spline geometry connecting the two points. The controller, when the robot reaches one of the points of the spline geometry, can correlate the navigation system with the polynomial function such that the robot moves along the spline geometry. For example, for obstacles with geometries not easily defined by arcs, the controller can generate spline geometries to approximate a route to avoid the obstacle geometries.

While the first traversal launch points 1540, 1640 have been described as selected during the process training the traversal route, in other implementations, the default traversal launch point can be the charging dock.

While the lawn area 102c has been described not to have a corresponding trained bypass route, in some implementations, the last lawn can have a trained bypass route that can be used as part of the return route. For example, during bypass route training, a bypass route can be trained for lawn area such that the robot can take the reverse of the bypass route in order to return to the charging station. Instead of using a traversal launch point for a traversal region for the end point of the bypass route that bypasses lawn area, the bypass route can use the end point of the mowing pattern for lawn area.

While the mowing pattern of a lawn route has been described to be complete after the coverage of the lawn, in some implementations, the controller can be programmed such that the mowing pattern of a lawn route terminates at the traversal launch point. For example, the end point of the lawn route can terminate at the traversal launch point of the traversal route.

In some implementations, the return route that the robot takes at the conclusion of a mowing operation can be a composition of bypass routes and traversal routes. For example, referring briefly to FIG. 7A, to return to the charging station 50 from the end point of the lawn route 1900b, the robot 10 can follow the bypass route 1800, the traversal route 1500, and the bypass route 1700 in the reverse direction.

While the path behavior data 330 has been described to be assigned to the traversal route data 315 and the bypass route data 320 with respect to FIG. 7 after the lawn route data 325 has been generated, it should be understood that the path behavior data 330 can be generated as each route data is being generated. For example, as the points for the traversal route data and the bypass route data are being generated, the path behavior data associated with those routes can be set such that the drive system is set at a mid-range activation level and the cutting system is deactivated. In some implementations, the controller can be programmed such that training the bypass route data and the traversal route data automatically associates those route data with a deactivation of the cutting system, and training the lawn route data automatically associates the lawn route data to an activation of the cutting system.

While a lawn route described herein applies to a continuous lawn, in some implementations, a lawn can be segmented into two separate lawn regions contiguous lawn regions. The robot can be scheduled to mow the lawn regions at different times.

While the selection of the traversal launch point and traversal landing points have been described as an automated selection based on optimization of the distance of the traversal launch point from the traversal landing point, in some implementations, the modification of the traversal launch point and the traversal landing point can be a manual operation. For example, the user can view the boundary data stored for the lawn areas on the application of the mobile device and manually select locations for the traversal launch points and traversal landing points.

While the steps of the flow charts shown in FIGS. 9-10 have been described as occurring sequentially, it should be understood that some steps can be performed in a different order. For example, referring to FIG. 9, training the traversal route between the first area and the second area can occur after training the mowing operation for the first area and the second area. Training the bypass route can occur before training the second lawn route or training the traversal route.

A number of embodiments of the invention have been described. Nevertheless, it will be understood that various modifications may be made without departing from the spirit and scope of the invention.

What is claimed is:

1. A method of mowing multiple areas, the method comprising:
   training an autonomous lawnmowing robot to mow the multiple areas by generating data indicative of a first boundary of a first of the multiple areas and a second boundary of a second of the multiple areas;
   training the robot to traverse the first of the multiple areas by generating data indicative of a user-selected route through the first of the multiple areas;
   transmitting the data indicative of the route and the data indicative of the first boundary and the second boundary to a mobile computing device to present a representation of the first boundary, the second boundary, and the route on a display of the mobile computing device; and
   initiating a mowing operation in which the robot autonomously
      disables a mowing function,
      subsequent to disabling the mowing function, travels to the second of the multiple areas by following the route without mowing the first of the multiple areas, and
      subsequent to traveling to the second of the multiple areas, activates the mowing function to mow the second of the multiple areas.

2. The method of claim 1, further comprising training the robot to traverse a space by generating data indicative of a user-selected traversal route through the space, the space separating the first of the multiple areas and the second of the multiple areas,
   wherein, during the mowing operation, the robot travels to the second of the multiple areas by following the traversal route through the space without mowing the space.

3. The method of claim 2, further comprising training the robot to traverse the space by generating data indicative of one or more user-selected points of the traversal route through the space.

4. The method of claim 1, wherein:
   generating the data indicative of the first boundary and the second boundary comprises
      generating data indicative of the first boundary while the robot is manually navigated along the first boundary, and
      generating data indicative of the second boundary while the robot is manually navigated along the second boundary; and
   training the robot to traverse the first of the multiple areas comprises
      generating the data indicative of the route while the robot is manually navigated along the route.

5. The method of claim 1, wherein:
   generating the data indicative of the first boundary and the second boundary comprises
      generating data indicative of the first boundary based on a user selection of the first boundary, and
      generating data indicative of the second boundary based on a user selection of the second boundary.

6. The method of claim 5, further comprising wirelessly receiving, from the mobile computing device, the user selection of the first boundary and the user selection of the second boundary.

7. The method of claim 1, wherein training the robot to mow the multiple areas comprises receiving a user selection of a movement pattern to cover the first of the multiple areas and a user selection of a movement pattern to cover the second of the multiple areas.

8. The method of claim 1, wherein training the robot to traverse the first of the multiple areas comprises receiving data representing an automatically selected route through the first of the multiple areas before generating the data indicative of the route.

9. The method of claim 1, further comprising wirelessly receiving, from the mobile computing device, the user selection of the route, wherein the user selection of the route overrides an automatically selected route through the first of the multiple areas.

10. The method of claim 9, wherein:
wirelessly receiving the user selection of the route comprises wirelessly receiving a plurality of user-selected points defining the route, the user-selected points including a launch point defining a start of the route and a landing point defining an end of the route, and
the data indicative of the route is generated based on the received user-selected points.

11. The method of claim 10, wherein the launch point corresponds to a location of a charging dock operable to charge a power source of the robot.

12. The method of claim 9, wherein wirelessly receiving the user selection of the route comprises receiving a user instruction to store a current position of the robot.

13. The method of claim 1, wherein training the robot to traverse the first of the multiple areas comprises generating the data indicative of the route through the first of the multiple areas while the robot is manually navigated along the route.

14. A method of controlling an autonomous lawnmowing robot to mow multiple areas, the method comprising:
initiating a training mode in which a user navigates the robot along a first boundary of a first of the multiple areas and along a second boundary of a second of the multiple areas;
transmitting, to the robot, data indicative of a user-selected route through the first of the multiple areas to train the robot to traverse the first of the multiple areas such that, during a mowing operation, the robot autonomously
disables a mowing function,
subsequent to disabling the mowing function, travels to the second of the multiple areas by following the route without mowing the first of the multiple areas, and
subsequent to traveling to the second of the multiple areas, activates the mowing function to mow the second of the multiple areas; and
presenting, on a display of a mobile computing device, a representation of the first boundary, the second boundary, and the route.

15. The method of claim 14, further comprising wirelessly transmitting, to the robot, an instruction to initiate the mowing operation.

16. The method of claim 14, further comprising transmitting, to the robot, data indicative of a user-selected traversal route through a space separating the first of the multiple areas and the second of the multiple areas,
wherein, during the mowing operation, the robot travels to the second of the multiple areas by following the traversal route through the space without mowing the space.

17. The method of claim 14, wherein transmitting the data indicative of the route comprises transmitting a plurality of user-selected points defining the route, wherein the user-selected points include a launch point defining a start of the route and a landing point defining an end of the route.

18. A method of controlling an autonomous lawnmowing robot to mow multiple areas, the method comprising:
navigating the robot along a first boundary of a first of the multiple areas;
navigating the robot along a second boundary of a second of the multiple areas to train the robot to mow the multiple areas;
selecting a route through the first of the multiple areas to train the robot to traverse the first of the multiple areas;
initiating presentation of a representation of the first boundary, the second boundary, and the route on a display of a mobile computing device; and
initiating a mowing operation in which the robot autonomously
disables a mowing function,
subsequent to disabling the mowing function, travels to the second of the multiple areas by following the route without mowing the first of the multiple areas, and
subsequent to traveling to the second of the multiple areas, activates the mowing function to mow the second of the multiple areas.

19. The method of claim 18, further comprising selecting a traversal route through a space separating the first of the multiple areas and the second of the multiple areas,
wherein, during the mowing operation, the robot travels to the second of the multiple areas by following the traversal route through the space without mowing the space.

20. The method of claim 18, wherein selecting the route comprises:
operating the mobile computing device to select a plurality of user-selected points defining the route, wherein the user-selected points include a launch point defining a start of the route and a landing point defining an end of the route, and
initiating transmission of the user-selected points to the robot to train the robot to traverse the first of the multiple areas.

21. The method of claim 1, further comprising, after transmitting the data indicative of the route and the data indicative of the first boundary and the second boundary to the mobile computing device:
receiving a user selection indicative of a modification to the route, and
modifying the data indicative of the route in response to receiving the user selection indicative of the modification.

22. The method of claim 14, further comprising, after presenting the representation of the first boundary, the second boundary, and the route:
transmitting, to the robot, a user selection indicative of a modification to the route to modify the route through the first of the multiple areas.

23. The method of claim 18, further comprising, after initiating presentation of the representation of the first boundary, the second boundary, and the route, initiating transmission of a user selection indicative of a modification to the route to modify the route through the first of the multiple areas.

* * * * *